(12) United States Patent
Sakaida

(10) Patent No.: US 7,887,094 B2
(45) Date of Patent: Feb. 15, 2011

(54) SEAT SYSTEM

(75) Inventor: Masafumi Sakaida, Hiroshima (JP)

(73) Assignee: Mazda Motor Corporation (JP)

( * ) Notice: Subject to any disclaimer, the term of this patent is extended or adjusted under 35 U.S.C. 154(b) by 322 days.

(21) Appl. No.: 12/132,175

(22) Filed: Jun. 3, 2008

(65) Prior Publication Data
US 2008/0303262 A1 Dec. 11, 2008

(30) Foreign Application Priority Data

| Jun. 5, 2007 | (JP) | 2007-149060 |
| Jun. 5, 2007 | (JP) | 2007-149070 |
| Jun. 19, 2007 | (JP) | 2007-161318 |

(51) Int. Cl.
*B60R 22/08* (2006.01)

(52) U.S. Cl. ............ 280/803; 280/806; 280/807; 280/808; 297/61; 297/391; 297/403

(58) Field of Classification Search .......... 280/803, 280/806, 807, 808; 297/61, 391, 403
See application file for complete search history.

(56) References Cited

U.S. PATENT DOCUMENTS

| 5,927,804 A * | 7/1999 | Cuevas ............ 297/216.12 |
| 6,145,881 A * | 11/2000 | Miller et al. ............ 280/806 |
| 6,811,186 B1 * | 11/2004 | Fraley et al. ............ 280/801.2 |
| 6,962,392 B2 * | 11/2005 | O'Connor ............ 297/61 |
| 7,604,081 B2 * | 10/2009 | Ootani et al. ............ 180/282 |
| 2001/0040065 A1 * | 11/2001 | Takagi et al. ............ 180/274 |
| 2007/0107969 A1 | 5/2007 | Ootani et al. |

FOREIGN PATENT DOCUMENTS

| DE | 3734152 A1 | 4/1989 |
| EP | 0264016 A2 | 4/1988 |
| EP | 0469326 A1 | 2/1992 |
| JP | 2000-233713 | 8/2000 |
| WO | 0145985 A1 | 6/2001 |

OTHER PUBLICATIONS

European Search Report; EP08009959; Dated Oct. 2, 2008.

* cited by examiner

*Primary Examiner*—Toan C To
(74) *Attorney, Agent, or Firm*—Studebaker & Brackett PC; Donald R. Studebaker

(57) ABSTRACT

A tensioner mechanism that winds a webbing to restrain a passenger seated in a seat when a vehicle crash is detected is provided near the seat. A headrest body is provided to protect the passenger at the vehicle rear crash. A drive mechanism is coupled to the tensioner mechanism via a connection member, and configured to drive the headrest body in accordance with a webbing-winding operation of the tensioner mechanism. Accordingly, the seat structure can be simple.

16 Claims, 15 Drawing Sheets

Vehicle Forward ⟷ Vehicle Rearward

SEAT SYSTEM

BACKGROUND OF THE INVENTION

The present invention relates to a seat system.

Conventionally, a tensioner mechanism that can improve the restraint function of a passenger by winding a seatbelt when a vehicle crash is detected or predicted is known. Japanese Patent Laid-Open Publication No. 2000-233713, for example, discloses a pretensioner as such a tensioner mechanism, which winds a shoulder belt of the seatbelt when the vehicle rear crash is detected or predicted.

Meanwhile, it is known that a seat comprises a movable portion that is provided so as to change its position to a specified position in order to protect the passenger when a vehicle crash is detected or predicted. In the above-described patent publication, for example, a headrest as such a movable portion is disclosed. That is, this headrest is configured to move upward, or forward and upward obliquely when the vehicle rear crash is detected or predicted, thereby stably holding a head of the passenger to be pushed rearward with the seatbelt-winding operation of the above-described tensioner mechanism.

Herein, it may be necessary to provide a drive source, such as a drive motor or a powder-explosion type of inflator, to drive the above-described movable portion. The above-described patent publication discloses a seat equipped with a particular drive source for the headrest. However, the structure of this seat with such the particular drive source would become improperly complex.

SUMMARY OF THE INVENTION

The present invention has been devised in view of the above-described matter, and an object of the present invention is to provide a properly simple structure of the seat.

According to the present invention, there is provided a seat system, comprising a seat for a vehicle, the seat comprising a movable portion that is provided so as to change a position thereof relative to a body of the seat, a tensioner mechanism operative to wind a webbing of a seatbelt to restrain a passenger seated in the seat when a vehicle crash is detected or predicted, and a drive mechanism operative to drive the movable portion of the seat so as to change the position of the movable portion to a specified position for protection of the passenger seated in the seat, wherein the tensioner mechanism is coupled to the drive mechanism via a connection member so that a winding movement of the webbing of the seatbelt by the tensioner mechanism can be transmitted to the drive mechanism via the connection member, whereby the movable portion of the seat can be driven by the drive mechanism in accordance with operation of the tensioner mechanism.

According to the present invention, the drive mechanism is coupled to the tensioner mechanism via the connection member so that the winding movement of the webbing of the seatbelt by the tensioner mechanism can be transmitted to the drive mechanism via the connection member. Thus, the drive source of the movable portion of the seat is substantially comprised of the tensioner mechanism. Accordingly, the seat does not need any particular drive source provided additionally, so that the seat structure can be properly simple.

According to an embodiment of the present invention, the tensioner mechanism is disposed near the seat, there is provided a seat slide mechanism operative to move the seat in a vehicle longitudinal direction relative to a vehicle floor panel, and the connection member is comprised of a flexible member. Thereby, since the tensioner mechanism is disposed near the seat, the seat does not need to be equipped with the tensioner mechanism, so that the seat stricture can be further properly simple. Further, since the connection member is comprised of the flexible member, even if the distance between the tensioner mechanism and the drive mechanism changes due to the slide movement of the seat with seat slide mechanism, the drive of the movable portion can be properly achieved by the drive mechanism regardless of the change of the distance.

According to another embodiment of the present invention, the movable portion of the seat is driven so as to change to the specified position when the vehicle crash is detected or predicted, and the drive mechanism comprises a biasing member that is provided between the movable portion and the seat body so as to bias the movable portion in a direction of movement of the movable portion, an engaged member that is provided at the movable portion, and an engaging member that is provided at the seat body so as to be coupled to the tensioner mechanism via the connection member and to usually engage with the engaged member against biasing of the biasing member, and the drive mechanism is configured such that the engaging member is moved via the connection member in accordance with the webbing-winding operation of the tensioner mechanism so as to release an engagement with the engaged member, thereby the movable portion is moved in the direction of movement of the movable portion by the biasing of the biasing member. Thus, since the structure of the drive mechanism is properly simple, the structure of the seat can be made further simple. Further, the movement of the movable portion is achieved substantially by the biasing of the biasing member with the release of engagement between the engaging member and the engaged member in accordance with the webbing-winding operation of the tensioner mechanism. Accordingly, the webbing-winding operation of the tensioner mechanism may not be obstructed at all, so that the proper restraint of the passenger with the webbing of the seatbelt can be ensured.

According to another embodiment of the present invention, an amount of winding of the webbing of the tensioner mechanism that is necessary for releasing engagement between the engaged member and the engaging member is configured to be smaller than a whole amount of winding of the webbing of the tensioner mechanism. Thereby, the movement of the movable portion can be surely complete before or at the time of completion of winding the webbing of the tensioner mechanism.

According to another embodiment of the present invention, the movable portion of the seat is driven so as to change to the specified position when the vehicle crash is detected or predicted, and the drive mechanism comprises a rack that is provided at the movable portion and a pinion that is provided at the seat body so as to be coupled to the tensioner mechanism via the connection member and to engage with the rack, and the drive mechanism is configured such that the pinion is rotated via the connection member in accordance with the webbing-winding operation of the tensioner mechanism so as to move the rack relative to the pinion, thereby the movable portion is moved in the direction of movement of the movable portion by the rack moving. Thus, since the structure of the drive mechanism is properly simple, the structure of the seat can be made further simple.

According to another embodiment of the present invention, an amount of winding of the webbing of the tensioner mechanism that is necessary for the rack to complete moving is configured to be smaller than a whole amount of winding of the webbing of the tensioner mechanism. Thereby, the movement of the movable portion can be surely complete before or at the time of the completion of winding the webbing of the tensioner mechanism.

According to another embodiment of the present invention, the connection member is coupled to the tensioner mechanism via the webbing of the seatbelt. Thereby, since there is no need of providing any particular member to connect the connection member to the tensioner mechanism, the structure of the tensioner mechanism can be made properly simple.

According to another embodiment of the present invention, the drive mechanism comprises a holding mechanism operative to hold the position of the movable portion of the seat at the specified position even after the position of the movable portion of the seat has been changed to the specified position. Thereby, since the movable portion may be properly held at the specified position even if a portion of the passenger's body contacts the movable portion, the protection of the passenger can improve with the movable portion. Particularly, the holding of the movable portion at the specified position can be keep even if the webbing would extend due to the restraint of the passenger after the vehicle crash, so that the protection of the passenger with the movable portion can further improve.

According to another embodiment of the present invention, the tensioner mechanism is configured to operate to wind the webbing of the seatbelt at least when a vehicle frontal crash is detected or predicted, and the movable portion of the seat that is driven by the drive mechanism comprises a front portion of a seat cushion that is configured to move upward at least when the vehicle frontal crash is detected or predicated. Thereby, a so-called submarine happening in which the passenger's hip improperly slides forward at the vehicle frontal crash can be restrained.

According to another embodiment of the present invention, the tensioner mechanism is configured to operate to wind the webbing of the seatbelt at least when a vehicle rear crash is detected or predicted, and the movable portion of the seat that is driven by the drive mechanism comprises a headrest body of the seat that is configured to move forward and/or upward at least when the vehicle rear crash is detected or predicated. Thereby, the passenger's neck can be properly protected by supporting the passenger's head with the headrest body at the vehicle rear crash.

According to another embodiment of the present invention, the drive mechanism is configured so that the above-described movement of the headrest body can be complete before or at the time of completion of winding the webbing of the tensioner mechanism. Thereby, the movement of the headrest body can be complete before the passenger's upper body is pushed rearward with the seatbelt-winding operation of the tensioner mechanism, so that it can be prevented for the passenger to feel an uncomfortable feeling with the passenger's head or neck.

According to another embodiment of the present invention, an expansion ratio of the connection member is configured to be smaller than that of the webbing. Thereby, the transmission of the drive movement from the tensioner mechanism to the drive mechanism via the connection member can be conducted surely, so that the movement of the headrest body can be complete promptly.

According to another embodiment of the present invention, the system comprises further an additional drive mechanism (hereinafter, referred to as "second drive mechanism") operative to drive so as to move a headrest of the seat forward and/or upward when the vehicle rear crash is detected or predicated. Thus, since the second drive mechanism moves the headrest (including the headrest body) in addition to the above-described drive mechanism (hereinafter, referred to as "first drive mechanism") moving the headrest body, the movement of the headrest body can be made greater. Further, since the first drive mechanism is configured to drive in accordance with the webbing-winding operation of the tensioner mechanism via the connection member at least when the vehicle rear cash is detected or predicted, the headrest body can be moved promptly. Accordingly, the passenger's head can be supported stably with the headrest by quickly and surely diminishing a gap between the headrest and the passenger's head at least at the detection or prediction of the vehicle rear crash. Thus, the protection of the passenger can be improved.

According to another embodiment of the present invention, the second drive mechanism is provided at a seat back of the seat so as to move the headrest forward and/or upward in accordance with a rearward movement of the passenger at a vehicle rear crash. Thereby, the second drive mechanism can move the headrest by using the passenger's rearward movement at the vehicle rear crash.

According to another embodiment of the present invention, the headrest is attached to the second drive mechanism, the second drive mechanism is supported at a frame of the seat back and has a load receiving portion to receive a load of the rearward movement of the passenger at the vehicle rear crash, and the second drive mechanism is configured to drive so as to move the headrest forward and/or upward with a drive force of the load of the rearward movement of the passenger that is received at the load receiving portion. Thereby, since the second drive mechanism can drive the headrest with the drive force of the load of the passenger's rearward movement, there is no need of providing an additional source of drive force. Accordingly, the amount of movement of the headrest can be made greater with the simple seat structure.

According to another embodiment of the present invention, the second drive mechanism is configured to drive so as to move the headrest forward when the vehicle rear crash is detected and when the vehicle rear crash is predicted and to move the headrest rearward when it is detected that the vehicle rear crash that has been predicted is avoided, and the tensioner mechanism is configured to wind the webbing when the vehicle rear crash is detected and not to wind the webbing when the vehicle rear crash is predicted. Thereby, since the second drive mechanism moves the headrest so as to quickly diminish the gap between the headrest and the passenger's head at the prediction of the vehicle rear crash as well, the protection of the passenger can be further improved. Further, the second drive mechanism moves the headrest rearward when it is detected that the vehicle rear crash that has been predicted is avoided. Accordingly, the passenger needs not to operate the headrest, which has been moved forward at the prediction of the vehicle rear crash, to return to the rearward position when it is detected that the vehicle rear crash that has been predicted is avoided. Accordingly, any troublesome operation may be avoided.

According to another embodiment of the present invention, the tensioner mechanism is configured to wind the webbing when a vehicle frontal crash is detected or predicted. Thereby, the passenger's restraint with the webbing can be ensured when the vehicle frontal crash is detected or predicted. Further, since the second drive mechanism may not operate when the vehicle frontal crash is detected or predicted, the amount of movement of the headrest becomes smaller compared to when both the first and second drive mechanisms operate. Accordingly, it can be prevented for the neck of the passenger to bend downward improperly greatly when the passenger is restrained at the seat at the vehicle frontal crash. Thus, the passenger's protection at the detection or prediction of the vehicle frontal crash can be improved without the passenger feeling improperly.

In the present description, the meaning of "at the vehicle rear crash" includes a case of "at the detection of the vehicle rear crash" when a real occurrence of the vehicle rear crash is detected, likewise the meaning of "at the vehicle frontal crash" includes a case of "at the detection of the vehicle frontal crash" when a real occurrence of the vehicle frontal crash is detected.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
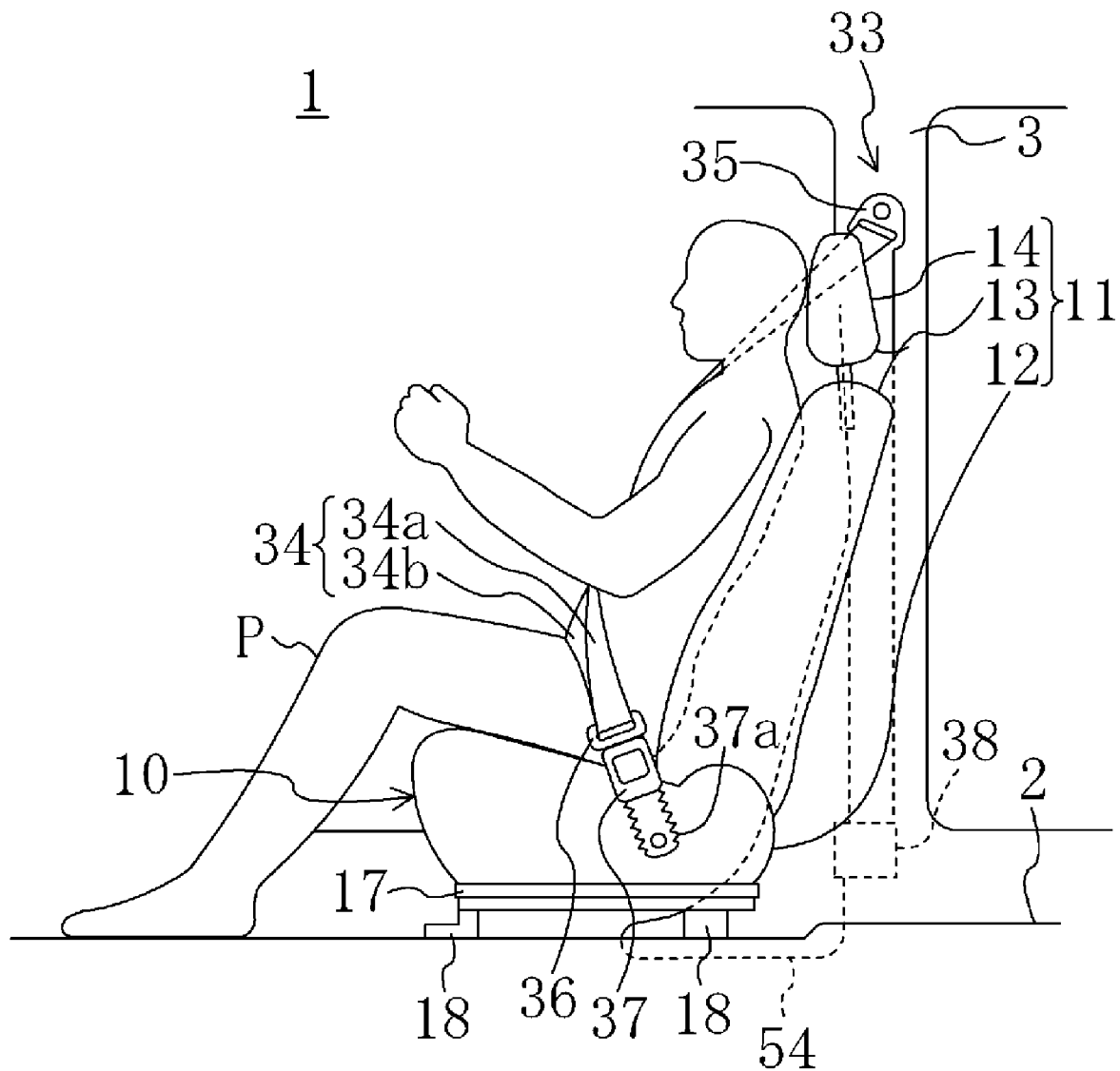
FIG. 1 is a schematic side view of a driver's seat according to a first embodiment of the present invention.
Figure 2:
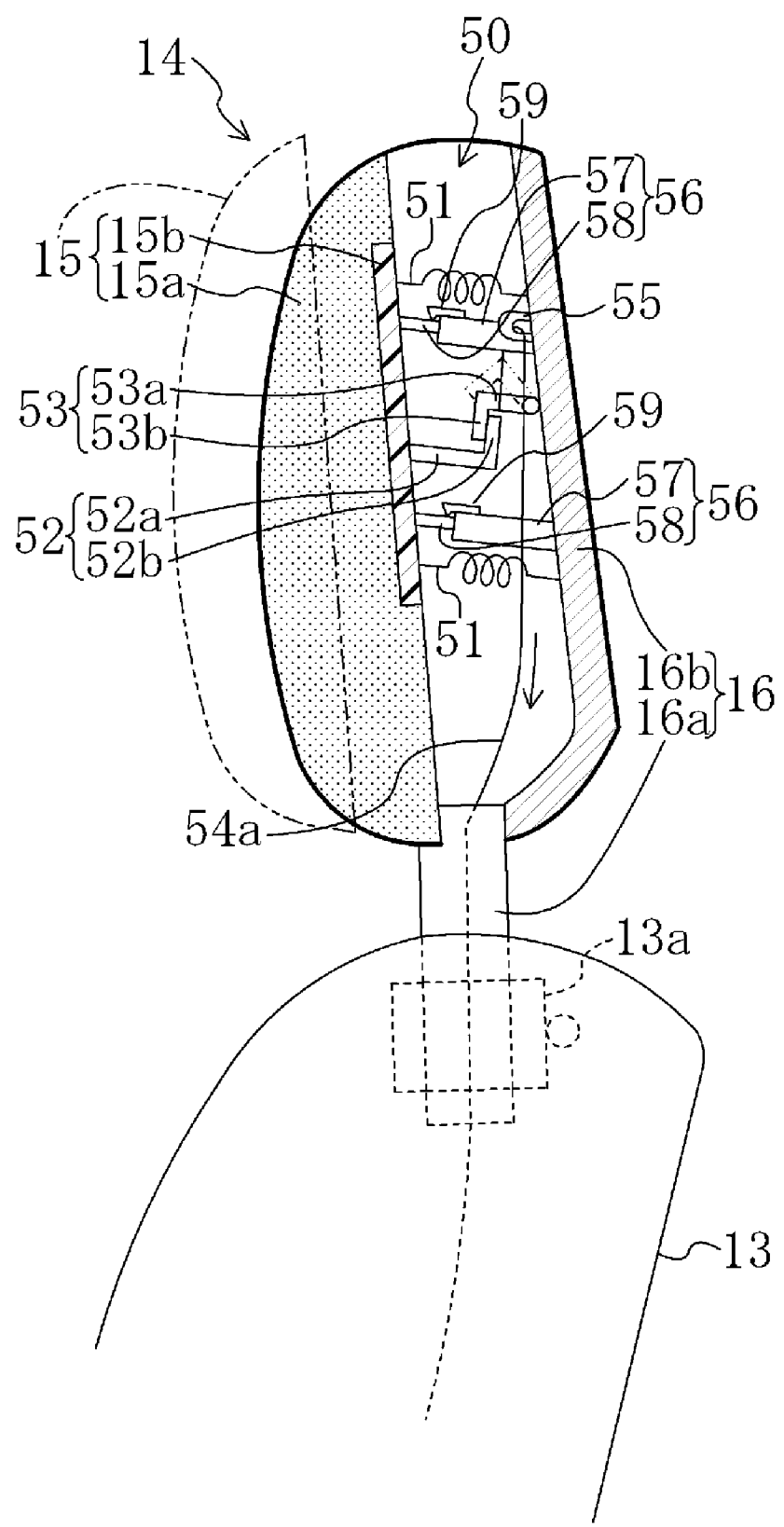
FIG. 2 is a sectional view of a headrest.
Figure 3:
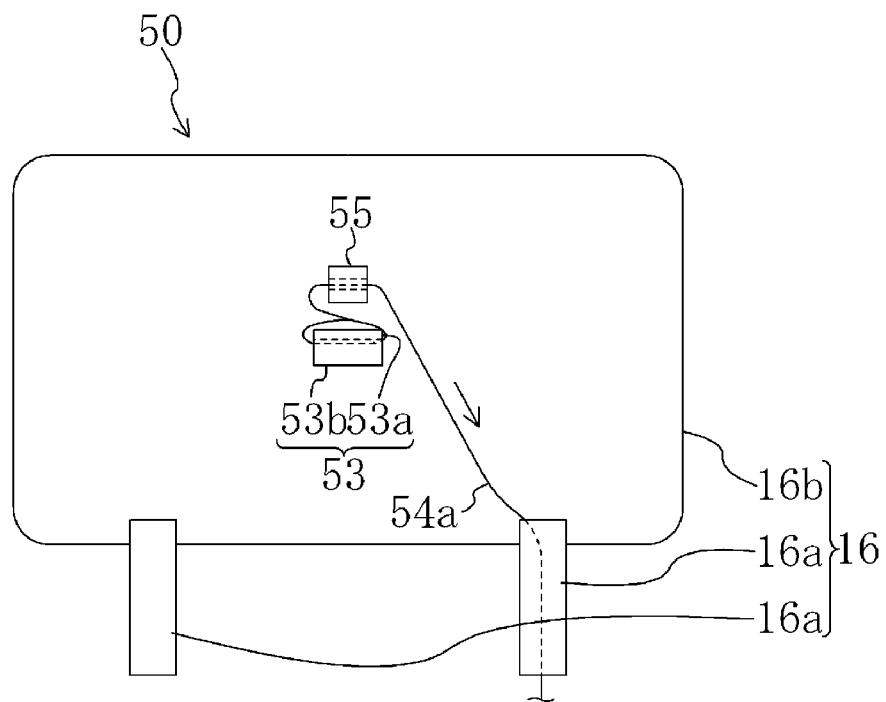
FIG. 3 is an elevation view of a headrest frame.

A seat system 1 of the present embodiment, as shown in FIGS. 1-3, comprises a seat device 10, a seatbelt device 30 (see FIG. 4) and a drive mechanism 50. The seat device 10 comprises a seat 11, a seat slide mechanism 17 and a seat mount 18. The seat device 10 shows a driver's seat in FIG. 1.

The seat 11 comprises a seat cushion 12, a seat back 13 that is provided at a rear end portion of the seat cushion 12 to be foldable on the seat cushion 12, and a headrest 14 that is provided at an upper end portion of the seat back 13.

The headrest 14 comprises a headrest body (movable portion) 15 that is moved forward and upward obliquely when a vehicle rear crash is detected (when a tensioner mechanism 38 of the seatbelt device 30 operates) and a headrest frame (headrest base portion) 16 that is made of metal and provided behind the headrest body 15. The above-described forward movement of the headrest body 15 at a detection of the vehicle rear crash is for properly supporting a head of a passenger P seated in the seat 11 who is to be pushed rearward with a shoulder belt 34a of the seatbelt device 30 that is wound at the vehicle rear crash. This proper supporting of the passenger's head may be attained by diminishing a gap between the head and the headrest 14. Meanwhile, the above-described upward movement of the headrest body 15 at the detection of the vehicle rear crash is for properly supporting the passenger's head that tends to move upward relative to the headrest 14 at the vehicle rear crash due to deformation or inclination of the seat back 13. This proper supporting of the passenger's head may be attained by adjusting this relative displacement between the head and the headrest 14.

The headrest body 15 comprises a flexible cushion member (pad member) 15a and a plate member 15b that is made of resin and provided behind the cushion member 15a. Part of the seat 11 other than the movable portion may constitute a seat body. The headrest frame 16 includes two cylindrical pipe frames 16a, 16a that extend vertically and be located side by side with a specified distance from each other, and a plate frame 16b that is welded to upper end portions of the pipe frames 16a, 16a and located so as to face the headrest body 15. Each pipe frame 16a is movably inserted into a cylindrical member 13a that is provided at an upper end portion of the seat back 13 so as to extend substantially vertically. Thereby, the headrest 14 is configured to be movable substantially in the vertical direction relative to the seat back 13.

The seat slide mechanisms 17 are provided at both sides of a lower face of the seat cushion 12 so as to make the seat 11 can slide longitudinally (in a seat longitudinal direction) relative to a floor panel 2. The seat mounts 18 are provided at front and rear ends of a lower face of each seat slide mechanism 17 so as to support the seat 11 on the floor panel 2.

Figure 4:
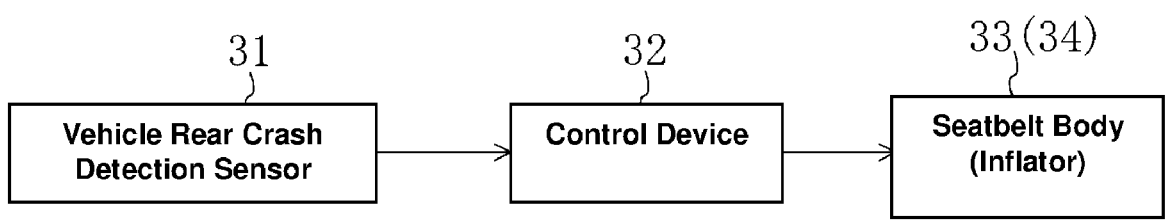
FIG. 4 is a block diagram of a seatbelt device.

The seatbelt device 30 comprises a rear-crash detection sensor 31, a control device 32, and a seatbelt body 33 as shown in FIG. 4. The rear-crash detection sensor 31, which is provided at a rear end portion of a vehicle, is comprised of a G sensor to detect a vehicle rear crash. This sensor 31 is configured to output a rear-crash detection signal to the control device 32 when detecting the vehicle rear crash. The control device 32 is configured to output an operational signal to an inflator 44 of the seatbelt body 33 when receiving the rear-crash detection signal from the rear-crash detection sensor 31.

The seatbelt body 33, which is a so-called three pint type as shown in FIG. 1, comprises a webbing 34 that can restrain the passenger P at the seat 11 and a tensioner mechanism 38 that can wind a shoulder belt 34a of the webbing 34 when the vehicle rear crash is detected. The webbing 34 is provided so as to be extend through a shoulder anchor 35 that is provided at an upper end portion of a center pillar 3 and a tongue 36. One end of the webbing 34 is attached to a retractor 39 (see FIGS. 5 and 6) of the tensioner mechanism 38, and the other end of the webbing 34 is attached to an outside end portion of the seat cushion 12. The tongue 36 is configured to be inserted into (engages with) a buckle 37, which has a bellows portion 37a that is fixed to an inside end face of the seat cushion 12 via a bolt or the like. When the tongue 36 engages with the buckle 37, the passenger P can be restrained at the seat 11 with the webbing 34. The webbing 34 comprises the shoulder belt 34a operative to restrain a shoulder and chest (upper body) of the passenger P at the seat back 13 and a lap belt 34*b* operative to restrain a waist of the passenger P at the seat cushion 12.

Figure 5:
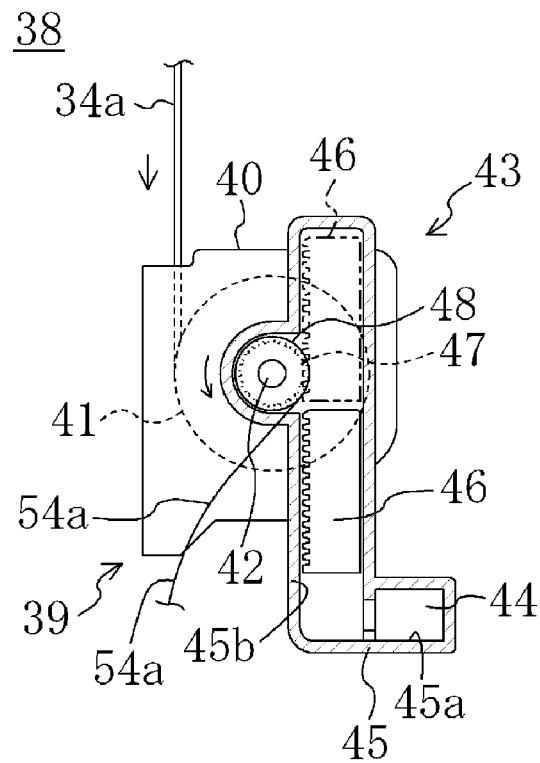
FIG. 5 is a sectional view of a tensioner mechanism.
Figure 6:
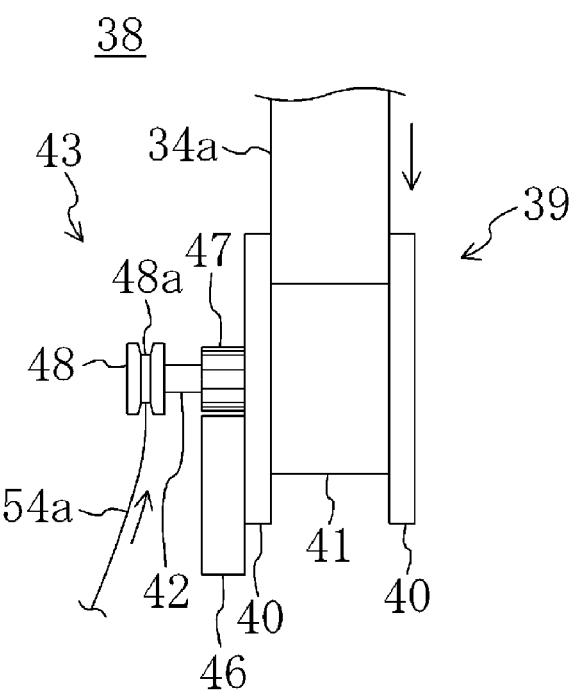
FIG. 6 is an elevation view of the tensioner mechanism.

The tensioner mechanism 38 is provided at a lower end portion inside the center pillar 3, and comprises the retractor 39 and a so-called powder-explosion type of shoulder-pretensioner 43 that is attached to side plates 40 of the retractor 39 as shown in FIGS. 5 and 6.

The retractor 39 comprises two side plates 40, 40 that are located side by side with a specified distance from each other, and a reel shaft 41, which is rotatably supported at the both side plates 40, 40 and to which the one end of the webbing 34 is fixed. A drive shaft 42 to rotate the reel shaft 41 is provided at a front end face of the reel shaft 41 so as to project forward through a through hole (not illustrated) formed at the front side plate 40.

The shoulder pretensioner 43 comprises an inflator 44, a rack (piston) 46, a pinion 47 and a pulley 48. The inflator 44, which is accommodated in an accommodation space 45*a* at the bottom of a housing 45, generates gas when receiving the operational signal from the control device 32. A cylinder 45*b* is provided at the housing 45 so as to extend vertically and connect to the accommodation space 45*a*. The inflator 44 and housing 45 are not illustrated in FIG. 6 for simplicity of the figure.

The rack 46, which is installed so as to slide axially in the cylinder 45*b*, is configured so that when its lower end face receives a gas pressure from the inflator 44, it can move vertically to an upper specified position (see a position shown with a two-dotted broken line in FIG. 5) from its normal position.

The pinion 47, which is fixed to the drive shaft 42, is configured so as to rotate counterclockwise with engagement with the rack 46 as the rack 46 moves from the normal position to the specified position, as shown in FIG. 5. In accordance with the rotation of the pinion 47, the drive shaft 42 and reel shaft 41 also rotate in the same direction, thereby a specified amount of shoulder belt 34*a* is wound by the reel shaft 41. The upper body of the passenger P is pushed rearward (drawn back) with this winding of the shoulder belt 34*a*.

The pulley 48 is fixed at a tip of the drive shaft 42 in front of the pinion 47. One end of a wire 54*a* of a cable member (connection member) 54 is stopped at a groove portion 48*a* of the pulley 48, and the pulley 48 is configured to rotate together with the rotation of the drive shaft 42 in the same direction. The wire 54*a* is wound up at the groove portion 48*a* of the pulley 48.

Herein, although its illustration is omitted here, a tensioner mechanism to wind a lap belt 34*b* of the webbing 34 at the detection of the vehicle rear crash is installed at the outside end portion of the seat cushion 12.

The drive mechanism 50 comprises, as shown in FIGS. 2 and 3, springs (biasing member) 51, an engaged member 52, an engaging member 53, cylinder members 56, and stopper members (holding mechanism) 59. Each spring 51 is provided so as to extend obliquely between a rear face of the plate member 15*b* of the headrest body 15 and a front face of the plate frame 16*b* of the headrest frame 16, so that the headrest body 15 can be biased forward and upward as shown in FIG. 2. Herein, an illustration of the springs 51, cylinder members 56, stopper members 59 is omitted in FIG. 3 just for simplicity.

The engaged member 52, which is provided at the center of the rear face of the plate member 15*b* so as to project having a substantially L shape, includes a lower plate 52*a* that extends obliquely downward from the plate member 15*b* and a rear plate 52*b* that extends upward from a rear end portion of the lower plate 52*a* with a right angle relative to the lower plate 52*a*.

The engaging member 53 with a substantially L shape, a rear end portion of which is pivotally supported at the front face of the plate frame 16*b* with a rotational axis along the vehicle width direction, includes an upper plate 53*a* that extends obliquely upward from the plate frame 16*b* and a front plate 53*b* that extends downward from a front end portion of the upper plate 53*a* with a right angle relative to the upper plate 53*a*. The front plate 53*b* usually hooks the rear plate 52*b* of the engaged member 52. Thus, the engaging member 53 usually engages with the engaged member 52 against biasing of the spring 51. The upper plate 53*a* is coupled to the pulley 48 of the tensioner mechanism 38 via the cable member 54.

Figure 7:
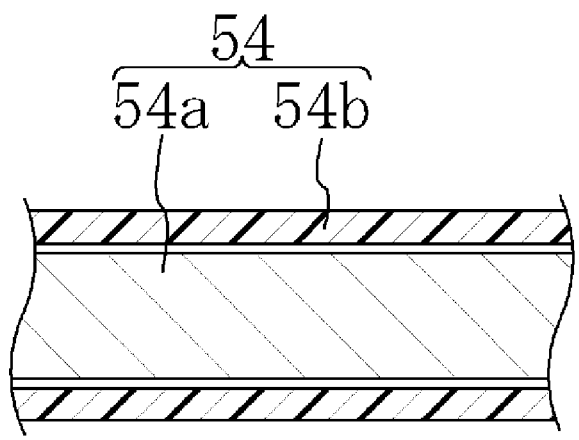
FIG. 7 is a longitudinal sectional view of a cable member.

The cable member 54 is comprised of a flexible member, which has the flexible wire 54*a* and an outer tube 54*b* as shown in FIG. 7. The cable member 54 is provided, as shown in FIGS. 1-3, 5 and 6, so as to extend from the pulley 48 of the tensioner mechanism 38 as a starting point, passing inside of the center pillar 3, a space below the floor panel 2, a rear end portion of the inside of the seat cushion 12, and a back-face portion of the inside of the seat back 13, going through the pipe frame 16*a* and a cable anchor 55 formed at the front face of the plate frame 16*b* that is located just above the engaging member 53, and to the upper plate 53*a* of the engaging member 53. The wire 54*a* is disposed inside the outer tube 54*b* so as to move, and its one end is attached to the pulley 48 and the other end is attached to the upper plate 53*a* of the engaging member 53. As apparent from the above, the cable member 54 is disposed with a margin length so as to change its contours, without interconnecting the pulley 48 and the engaging member 53 with the shortest distance. Thus, the engaging member 53 is pulled upward to rotate clockwise as shown in FIG. 2 as the pulley 48 winds the wire 54*a*. Namely, the engaging member 53 is rotated via the cable member 54 in accordance with the webbing-winding operation of the tensioner mechanism 38 (see its position shown by the two-dotted broken line in FIG. 2). This rotation of the engaging member 53 releases the engagement with the engaged member 52. Then, the headrest body 15 is biased forward and upward by the spring 51, so that the headrest body 15 moves forward and upward obliquely by a specified distance, which may be 3 cm, for example (see its position shown by a two-dotted broken line in FIG. 2).

Herein, the outer tube 54*b* is configured not to move even if the wire 54*a* of the cable member 54 has been wound up by the pulley 48 of the tensioner mechanism 38. Meanwhile, the wire 54*a* and the outer tube 54*b* are configured to change their contours when the seat 11 slides longitudinally.

Figure 8:
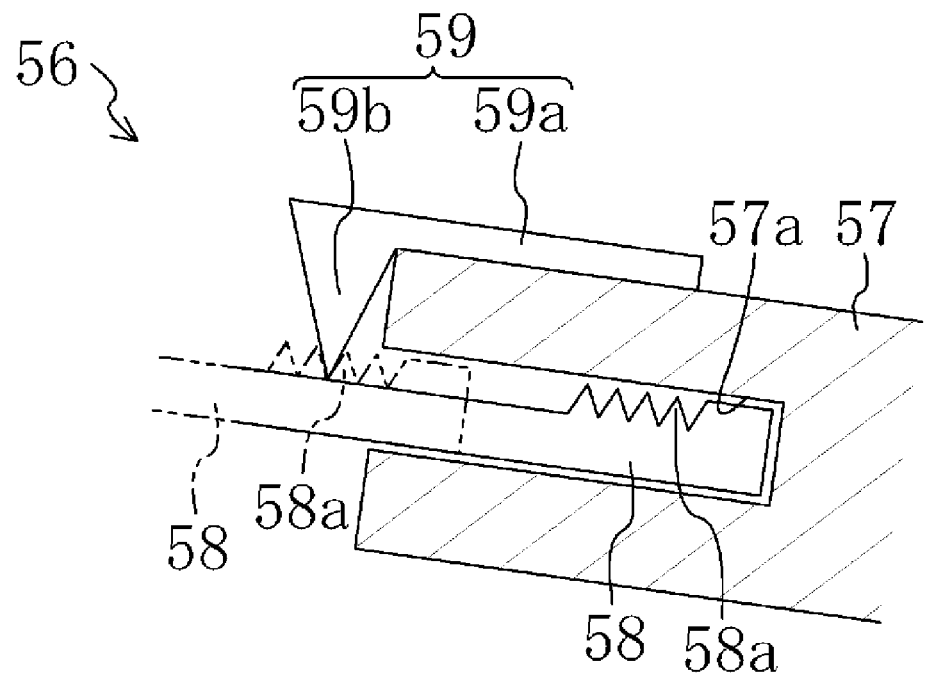
FIG. 8 is a sectional view of a cylinder member.

The cylinders 56 are, as shown in FIGS. 2, 3 and 8, provided so as to extend obliquely between the rear face of the plate member 15*b* and the front face portion of the plate frame 16*b*. Each cylinder member 56 comprises a pole member 57 with a rectangular cross section that is attached to the plate frame 16*b* at its rear end and has an insertion hole 57*a* extending forward and upward obliquely, and a bar member 58 that is attached to the plate member 15*b* at its front end and is to be inserted movably into the hole 57*a*. A sawtooth 58*a* is formed at an upper side of a rear end portion of the bar member 58. Herein, the bar member 58 moves forward and upward along the insertion hole 57*a* of the pole member 57 in accordance with the movement of the headrest body 15. Thereby, the movement of the headrest body 15 is guided.

The stopper member 59 includes a body portion 59*a* that is attached to a front end portion of the upper face of the pole member 57 and extends forward and upward obliquely on the pole member 57, and a triangle hook portion 59b that extends downward from a front end portion of the body portion 59a with a right angle relative to the body portion 59a. The stopper member 59 is configured to bias the bar member 58 downward. Herein, when the bar member 58 (headrest body 15) has moved, the hook portion 59b engages with (hooks) a specified recess portion of the sawtooth 58a of the bar member 58 (see its position shown by a two-dotted broken line in FIG. 8). Thereby, the position of the headrest body 15 is held at its movement completion position of the headrest body 15. Herein, the sawtooth 58a of the bar member 58 is configured to go over the recess portion without locking during the movement of the headrest body 15.

The drive mechanism 50 is configured so that the movement of the headrest body 15 can be complete before the completion of winding the webbing of the tensioner mechanism 38. In order to achieve this, the amount of winding of the webbing of the tensioner mechanism 38 that is necessary for releasing engagement between the engaged member 52 and the engaging member 53 is configured to be smaller than the whole amount of winding of the webbing of the tensioner mechanism 38 by properly arranging the size and shape of these members 52, 53. Further, the expansion ratio of the wire 54a is configured to be smaller than that of the webbing 34. Thereby, since the expansion ratio of the wire 54a is small, the transmission of the drive movement from the tensioner mechanism 38 to the drive mechanism 50 via the wire 54a can be conducted surely, so that the movement of the headrest body 15 can be complete promptly. Meanwhile, since the expansion ratio of the webbing 34 is great, the restraint (drawing) of the passenger P with the lap belt 34b of the webbing 34 can be delayed, so that a start timing of the upper body of the passenger P being pushed rearward is delayed. Accordingly, the movement of the headrest body 15 is complete before the upper body of the passenger P pushed rearward (drawing).

Hereinafter, the operation of the seat system 1 of the present embodiment at the detection of the vehicle rear crash will be described referring to FIGS. 1-8. When the vehicle rear crash is detected, the inflator 44 generates the gas, and the rack 46 that has received the gas pressure from the inflator 44 at the lower end face moves from the normal position to the specified position. In accordance with the movement of the rack 46, the pinion 47 engages with the rack 46 and rotates counterclockwise as shown in FIG. 5, thereby the reel shaft 41 and pulley 48 rotate in the same direction as well. Accordingly, the shoulder belt 34a is wound up at the reel shaft 41 with the rotation of the reel shaft 41, and the wire 54a is wound up at the pulley 48 with the rotation of the pulley 48.

As the wire 54a is wound by the pulley 48, the engaging member 53 is pulled upward so as to rotate clockwise as shown in FIG. 2. In accordance with this rotation, the engagement of the engaged member with the engaging member 53 is released. Accordingly, the headrest body 15 is moved forward and upward obliquely with the biasing of the spring 51. This movement is complete before the completion of winding the webbing of the tensioner mechanism 38.

According to the present embodiment, the drive mechanism 50 is coupled to the tensioner mechanism 38 via the cable member 54 so that the webbing-winding movement of the tensioner mechanism 38 can be transmitted to the drive mechanism 50 via the cable member 54. Thus, the drive source of the headrest 15 can be substantially comprised of the tensioner mechanism 38. Accordingly, the seat 11 does not need any particular drive source provided additionally, so that the seat structure can be properly simple.

Since the tensioner mechanism 38 is disposed near the seat 11, the seat 11 does not need to be equipped with the tensioner mechanism 38, so that the seat structure can be further properly simple. Further, since the cable member 54 is comprised of the flexible member, even if the distance between the tensioner mechanism 38 and the drive mechanism 50 changes due to the slide movement of the seat 11 with seat slide mechanism, the drive of the headrest body 15 can be properly achieved by the drive mechanism 50 regardless of the change of the distance. Since the structure of the drive mechanism 50 is simple, the seat structure can be made further simple.

Further, according to the present embodiment, the engaging member 53 is moved via the cable member 54 in accordance with the webbing-winding operation of the tensioner mechanism 38 so as to release the engagement with the engaged member 52, thereby the headrest body 15 is moved in the direction of its movement by the biasing of the spring 51. Thus, the movement of the headrest body 15 is achieved substantially by the biasing of the spring 51 with the release of the engagement between the engaging member 53 and the engaged member 52 in accordance with the webbing-winding operation of the tensioner mechanism 38. Accordingly, the webbing-winding operation of the tensioner mechanism 38 is not obstructed at all, so that the proper restraint of the passenger P with the webbing 34 can be ensured.

Further, the position of the headrest body 15 is held at the specified position even after the position of the headrest body 15 has been changed to the specified position. Thus, since the headrest body 15 is properly held at the specified position even if the passenger's head contacts the headrest body 15, the protection of the passenger P can improve with the headrest body 15.

Since the headrest body 15 is moved forward and upward obliquely at the detection of the vehicle rear crash, the passenger's neck can be properly protected by stably supporting the passenger's head.

Further, according to the present embodiment, the movement of the headrest body 15 can be complete before the completion of winding the webbing of the tensioner mechanism 38. Thereby, the movement of the headrest body 15 can be complete before the passenger's upper body is pushed rearward with the seatbelt-winding operation of the tensioner mechanism 38, so that it can be prevented for the passenger P to feel an uncomfortable feeling with the passenger's head or neck. Also, the movement of the headrest body 15 can be complete before the completion of winding the webbing of the tensioner mechanism 38 with the simple structure of the spring type of drive mechanism 50.

Since the amount of webbing-winding of the tensioner mechanism 38 that is necessary for releasing the engagement between the engaged member 52 and the engaging member 53 is configured to be smaller than the whole amount of webbing-winding of the tensioner mechanism 38, the movement of the headrest body 15 can be surely complete before the completion of webbing-winding of the tensioner mechanism 38.

Since the expansion ratio of the wire 54a is configured to be smaller than that of the webbing 34. Thereby, the transmission of the drive movement from the tensioner mechanism 38 to the drive mechanism 50 via the wire 54a can be conducted surely, so that the movement of the headrest body 15 can be complete promptly. Thus, the movement of the headrest body 15 can be surely complete before the completion of webbing-winding of the tensioner mechanism 38.

Herein, although the present embodiment uses the spring 51, any other type of biasing member may be applied as long as that is provided between the headrest body 15 and the seat body so as to bias the headrest body 15 in the direction of its movement.

Further, although the engaged member 52 and engaging member 53 are comprised of members having L-shaped cross section in the present embodiment, any other type of members may be applied as long as their engagement is released in accordance with the webbing-winding operation of the tensioner mechanism 38 that is coupled to the engaging member 53 via the cable member 54.

Embodiment 2

A drive mechanism 50' of a second embodiment is different from the drive mechanism of the above-described first embodiment. Hereinafter, that difference will be described.

Figure 9:
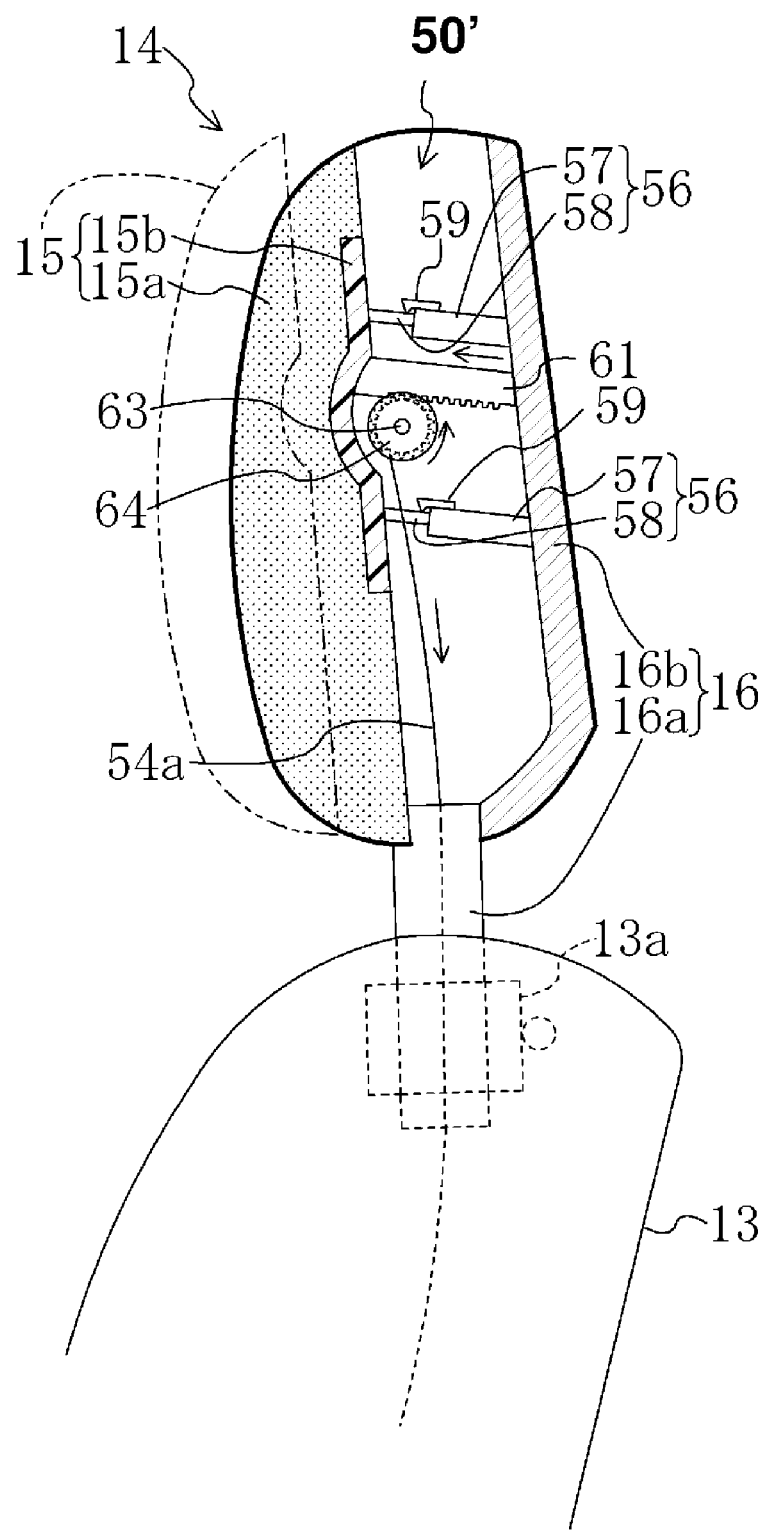
FIG. 9 is a sectional view of a headrest according to a second embodiment of the present invention.
Figure 10:
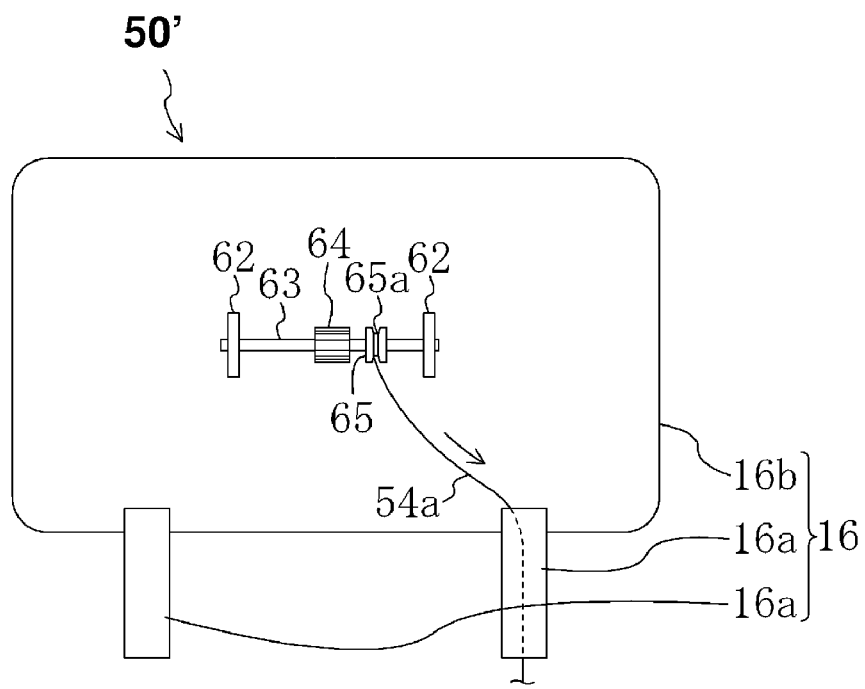
FIG. 10 is an elevation view of a headrest frame.

The drive mechanism 50' of the present embodiment comprises a rack 61, a pinion 64 and a pulley 65 as shown in FIGS. 9 and 10, instead of the spring 51, engaged member 52 and engaging member 53 of the first embodiment. The rack 61 is provided at the center of the rear face of the plate member 15b of the headrest body 15 so as to project rearward, extending obliquely downward (in an opposite direction to the movement direction of the headrest body 15).

A pair of bracket members 62, 62 is provided at the center of the plate frame 16b of the headrest frame 16 so as to project forward with a specified distance therebetween in the vehicle width direction. A rotational shaft 63 is rotatably supported at the both bracket members 62, 62 so as to extend in the vehicle width direction. The above-described pinion 64 and pulley 65 are fixed to the rotational shaft 63. The pinion 64 is disposed just below the rack 61 and engages with the rack 61. The pulley 65 is attached to a portion of the rotational shaft 63 inside from the pinion 64. One end of the wire 54a of the cable member 54 is attached to a groove portion 65a of the pulley 65, and a specified amount of the wire 54a is wound up at the groove portion 65a. Thus, the pinion 64 is coupled to the pulley 48 of the tensioner mechanism 38 via the cable member 54, pulley 65 and rotational shaft 63. Thereby, when the wire 54a is wound up at the pulley 48 of the tensioner mechanism 38, the wire 54a wound up at the pulley 65 is pulled downward and withdrawn from the pulley 65. The pulley 65 rotates counterclockwise by this withdrawal as shown in FIG. 9. The rotational shaft 63 and pinion 64 rotate in the same direction together with the rotation of the pulley 65. Thus, the pinion 64 rotates in accordance with the webbing-winding operation of the tensioner mechanism 38 via the cable member 54. The rack 61 moves forward and upward (in the movement direction of the headrest body 15) by a specified amount relative to the pinion 64 in accordance with the rotation of the pinion 64, thereby the headrest body 15 can be moved forward and upward by the specified amount (see its position shown by a two-dotted broken line in FIG. 9). For simplicity of the figures, illustration of the bracket members 62 is omitted in FIG. 9, while illustration of the cylinder member 56 and stopper members 59 is omitted in FIG. 10.

Further, the drive mechanism 50' is configured so that the movement of the headrest body 15 is complete before the completion of the webbing-winding of the tension mechanism 38 like the first embodiment. In order to achieve this, the amount of the webbing-winding of the tensioner mechanism 38 that is necessary for completion of the movement of the rack 61 is configured to be smaller than the whole amount of the webbing-winding of the tensioner mechanism 38 by properly arranging the size and shape of the rack 61, pinion 64, pulley 65 and the like, such as shortening a tooth length of the rack 61, reducing a diameter of the pulley 65. Further, the expansion ratio of the wire 54a is, like the first embodiment, configured to be smaller than that of the webbing 34. Accordingly, the movement of the headrest body 15 is complete before the upper body of the passenger P pushed rearward (drawing).

Hereinafter, only an operation of the seat system 1 at the detection of the vehicle rear crash according to the present embodiment that is different from that of the first embodiment will be described. When the wire 54a is wound up at the pulley 48 of the tensioner mechanism 38, the wire 54a wound up at the pulley 65 of the drive mechanism 50' is pulled downward and withdrawn from the pulley 65. The pulley 65 rotates counterclockwise by this withdrawal as shown in FIG. 9, and the rotational shaft 63 and pinion 64 rotate in the same direction. The rack 61 moves forward and upward obliquely in accordance with the rotation of the pinion 64, thereby the headrest body 15 can be moved forward and upward. Accordingly, since the structure of the drive mechanism 50' is simple, the seat structure can be made further simple.

Further, the movement of the headrest body 15 can be complete before the completion of the webbing-winding operation of the tensioner mechanism 38. Thus, according to the present embodiment, the movement of the headrest body 15 can be complete before the completion of the webbing-winding operation of the tensioner mechanism 38 with the simple structure of the rack-and-pinion type of drive mechanism 50'.

Since the amount of the webbing-winding of the tensioner mechanism 38 that is necessary for completion of the movement of the rack 61 is configured to be smaller than the whole amount of the webbing-winding of the tensioner mechanism 38, the movement of the headrest body 15 can be complete surely before the completion of the webbing-winding operation of the tensioner mechanism 38.

Herein, although the pinion 64 is provided at the headrest frame 16 via the bracket members 62 in the present embodiment, it may be provided in any manner as long as it engages with the rack 61.

Although the cable member 54 is coupled to the pinion 64 via the pulley 65 and rotational shaft 63 in the present embodiment, it may be coupled to the pinion 64 in any manner as long as the pinion 64 is operationally coupled to the tensioner mechanism 38 via the cable member 54.

Embodiment 3

Figure 11:
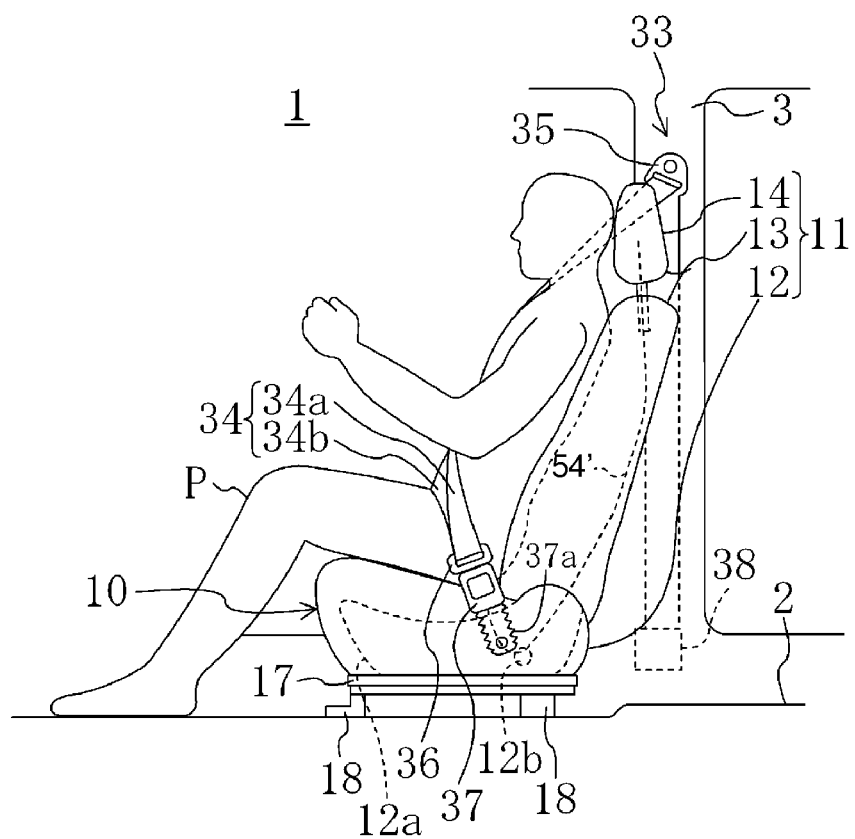
FIG. 11 is a schematic side view of a driver's seat according to a third embodiment of the present invention.

According to a third embodiment, a cable member 54' is coupled to the tensioner mechanism 38 via the shoulder belt 34a of the webbing 34, which is different from the first embodiment. Specifically, the cable member 54' is provided, as shown in FIG. 11, so as to extend from the buckle 37 as a starting point, passing inside of the bellows portion 37a of the buckle 37, going a through hole 12b formed at a side frame 12a of the seat cushion 12, passing a rear end portion inside the seat cushion 12 and a back face portion inside the seat back 13, going through the pipe frame 16a and the cable anchor 55, and to the upper plate 53a of the engaging member 53. One end of the wire 54a is attached to the buckle 37, and the other end is attached to the upper plate 53a of the engaging member 53. When the shoulder belt 34a is wound up at the reel shaft 41, the wire 54a is pulled toward the buckle 37. This pulling moves the engaging member 53 upward, which rotates clockwise as shown in FIG. 2. Thus, the engaging member 53 rotates in accordance with the webbing-winding operation of the tensioner mechanism 38 via the shoulder belt 34a, buckle 37 and cable member 54'. As apparent from the above, the present embodiment does not need provision of the pulley 48 for the tensioner mechanism. Other components are substantially the same as those of the first embodiment.

As described above, since the cable member 54' is coupled to the tensioner mechanism 38 via the webbing 34 according to the present embodiment, it may not be necessary for the tensioner mechanism 38 to have a member (e.g., pulley 48) to connect cable member 54', so that the structure of the tensioner mechanism 38 can be simple.

Further, since the position of the headrest body 15 is held at the position of its movement completion even if the webbing 34 expands due to the restraint of the passenger P at the vehicle rear crash, the protection of the passenger P with the headrest body 15 can be further improved. The present embodiment performs substantially the same operations and effects as the first embodiment on the other matters.

Herein, although the cable member 54' is coupled to the webbing 34 via the buckle 37 in the present embodiment, it may be coupled to the webbing 34 directly.

Although the spring-type of drive mechanism 50 (see the first embodiment) is applied for the coupling of the wire 34a to the tensioner mechanism 38 via the webbing 34 in the present embodiment, the rack-and-pinion type of drive mechanism 50' (see the second embodiment) may be applied.

Although the tensioner mechanism 38 is disposed at the lower end portion inside the center pillar 3 in the above-described embodiments, it may be disposed at the seat 11 or on the floor panel 2 near the seat 11.

Although the tension mechanism 38 of the above-described embodiments is operated at the detection of the vehicle rear crash, it may be operated when the vehicle crash is predicted. Also, it may be operated when a vehicle frontal crash is detected or predicted. The same things can be said for the headrest body 15 or the tensioner mechanism operative to wind the lap belt 34. The crash prediction may be conducted with sensors, such as a radar or a camera, and the control device 32 by calculating a distance or a position of an obstacle.

Although the drive mechanisms 50, 50' are configured to operate in accordance with the tensioner mechanism 38 to wind the shoulder belt 34a in the above-described embodiments, they may be configured to operate in accordance with a tensioner mechanism operative to wind the lap belt 34b. In this case, the drive mechanisms 50, 50' are configured so that the movement of the headrest body 15 can be complete before the completion of the webbing-winding operation of the tensioner mechanism 38.

Although the shoulder pretensioner 43 is a powder-explosion type, it may be a drive motor type.

Modification of Movable Portion

Although the movable portion is comprised of the headrest body 15 in the above-described embodiments, it may be comprised of any other member.

Figure 12:
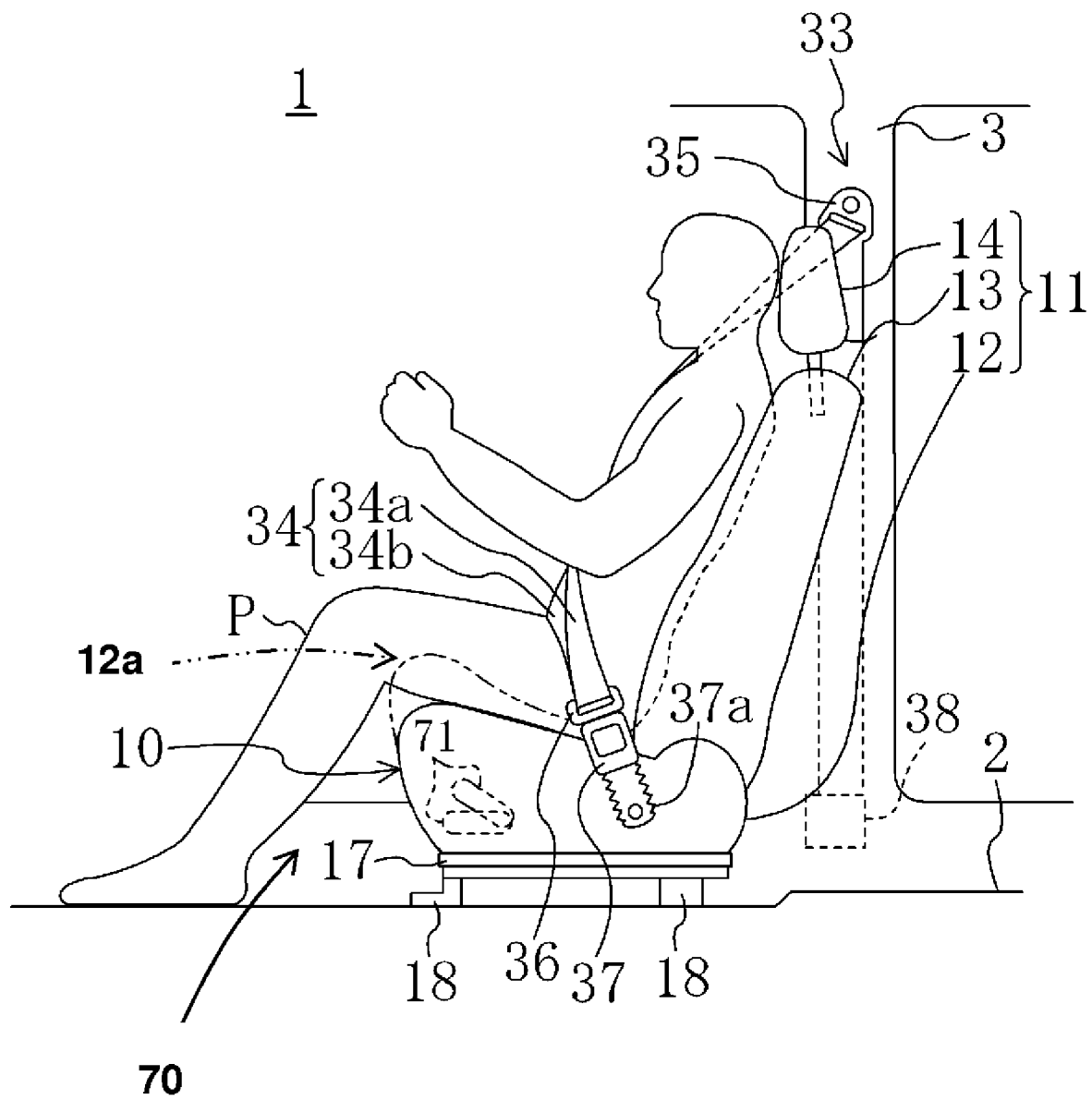
FIG. 12 is a schematic side view of a driver's seat according to a modified embodiment of the present invention.

For example, as shown in FIG. 12, the movable portion may be comprised of a front portion 12a of a seat cushion 12 that is configured to move upward at least when the vehicle frontal crash is detected or predicated. In this case, the tensioner mechanism 38 is configured to operate at least when the vehicle frontal crash is detected or predicated. Further, the drive mechanism is comprised of a tilt mechanism 70. This tilt mechanism 70 comprises a plate member 71. The plate mechanism 71 is configured such that its rear end portion is pivotally supported at an axis extending in the vehicle width direction between both-side side frames (not illustrated) of the seat cushion 12. The plate member 71 is positioned horizontally in a normal state, and it is coupled to the tensioner mechanism 38 via a cable member (not illustrated). The front portion 12a of the seat cushion 12 moves upward when the plate member 71 rotates clockwise as shown in FIG. 1 in accordance with the webbing-winding operation of the tensioner mechanism 38 (see their movements shown by two-dotted broken lines in FIG. 12). Thus, since the front portion 12a of the seat cushion 12 moves upward when the vehicle frontal crash is detected or predicated, a so-called submarine happening in which the passenger's hip improperly slides forward at the vehicle frontal crash can be restrained.

Further, the movable portion may be comprised of an ottoman that rotates rearward around an axis extending in the vehicle width direction at least when the vehicle frontal crash is detected or predicated. In this case, the tensioner mechanism is configured to operate at least when the vehicle frontal crash is detected or predicated. Further, the drive mechanism is comprised of a so-called ottoman mechanism. The ottoman mechanism is coupled to the tensioner mechanism via a cable member, and the ottoman thereof is configured to rotate rearward in accordance with the webbing-winding operation of the tensioner mechanism. Thus, since the ottoman rotates rearward when the vehicle frontal crash is detected or predicated, a leg of the passenger P can be restrained from being stuck between the ottoman and an instrument panel at the vehicle frontal crash.

Although the headrest body 15 is configured to move forward and upward obliquely at the detection of the vehicle rear crash in the above-described embodiments, it may be configured to move either forward or upward. The above oblique movement may be preferable though.

Although the drive mechanism 50, 50' adopt the spring type or rack-and-pinion type in the above-described embodiments, any type of drive mechanism may be applied as long as the headrest body 15 is configured to move in accordance with the webbing-winding operation of the tensioner mechanism 38 with the connection via the cable member 54, 54'.

Although the drive mechanisms 50, 50' are coupled to the pulley 48 of the tensioner mechanism 38 or the shoulder belt 34a of the webbing 34 via the cable members 54, 54' in the above-described embodiments, any manners of connection of the drive mechanism to the tensioner mechanism 38 may be applied as long as that is conducted via the cable members 54, 54'.

Although the connection member is comprised of the cable members 54, 54' in the above-described embodiments, it may be comprised of only the wire 54a. However, the cable member 54 may be preferable for the above-described first and second embodiments.

Although the seat slide mechanism 17 is provided at the seat 11 in the above-described embodiments, it may not be provided necessarily. In this case, it may not be necessary that the connection member is comprised of a flexible member.

Although the holding mechanism is comprised of the stopper member 59 in the above-described embodiments, it may be comprised of any member or it may be located anywhere as long as the position of the headrest body 15 can be held at its movement completion position after the completion of the movement of the headrest body 15.

Although the connection member is comprised of the wire 54a in the above-described embodiments, any other modification may be applied. However, it is preferable that the expansion ratio of the connection member be smaller than that of the webbing 34 to perform the functions and effects of the above-described embodiments appropriately.

Although the movement of the headrest body 15 is configured to be complete before the completion of the webbing-winding operation of the tensioner mechanism 38 in the above-described embodiments, it may be configured to be at the same time as the completion of the webbing-winding operation of the tensioner mechanism 38. However, it is preferable that that completion timing be set before the completion timing of the webbing-winding operation of the tensioner mechanism 38 to perform the functions and effects of the above-described embodiments appropriately.

Embodiment 4

Figure 13:
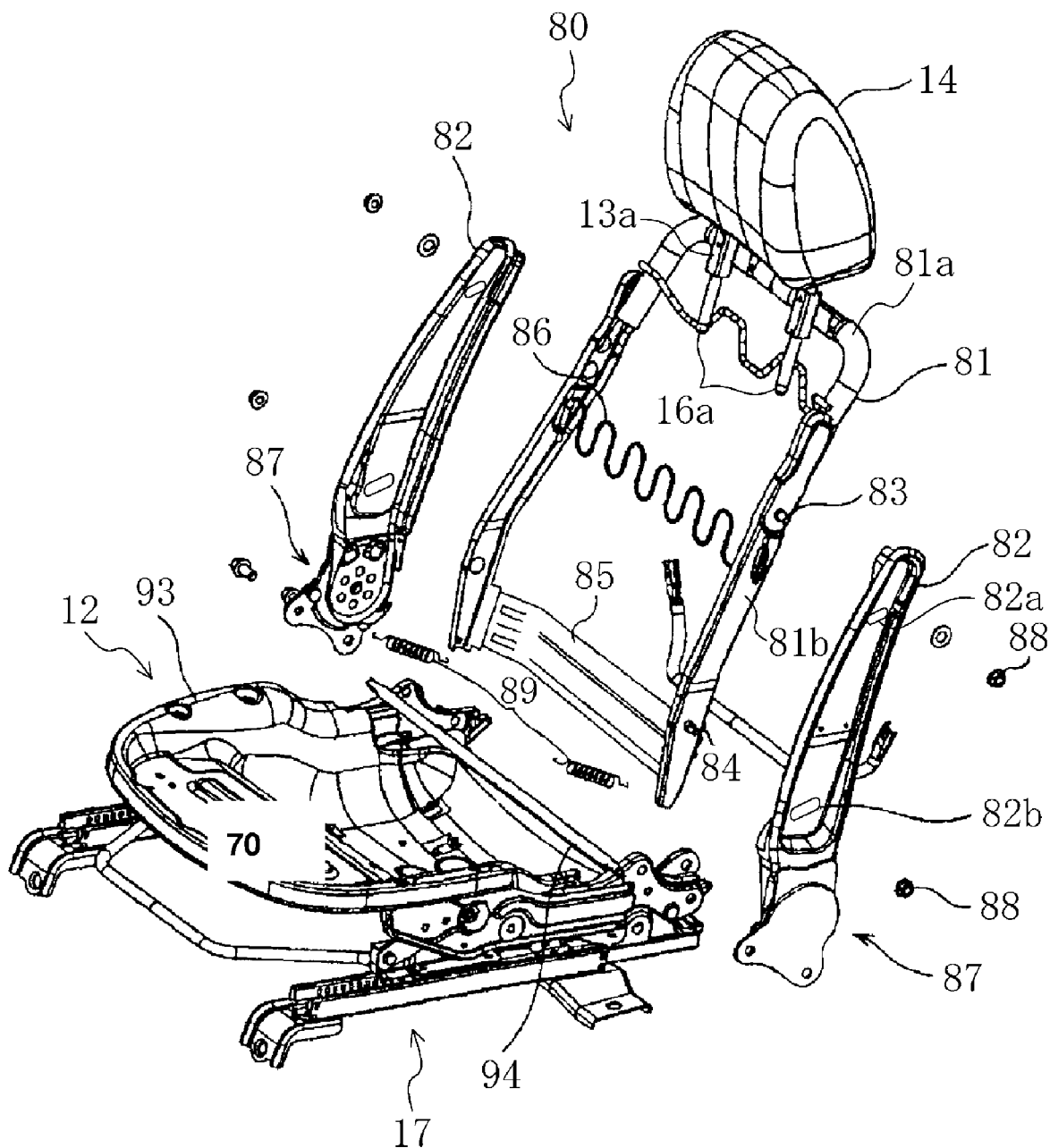
FIG. 13 is an exploded perspective view showing a frame structure of a seat according to a fourth embodiment of the present invention.
Figure 14:
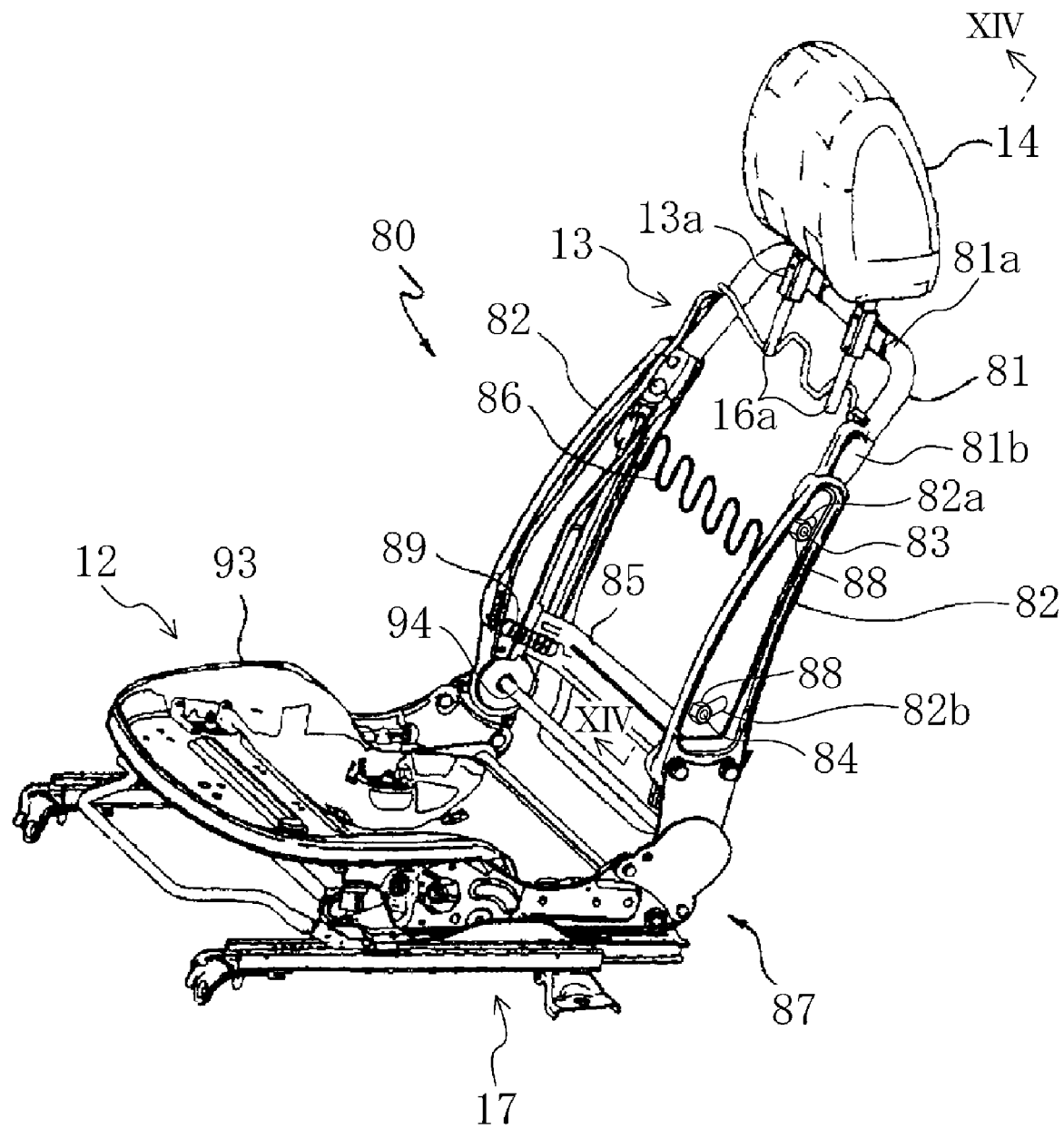
FIG. 14 is a perspective view of an assembling state of the frame stricture of the seat.
Figure 15:
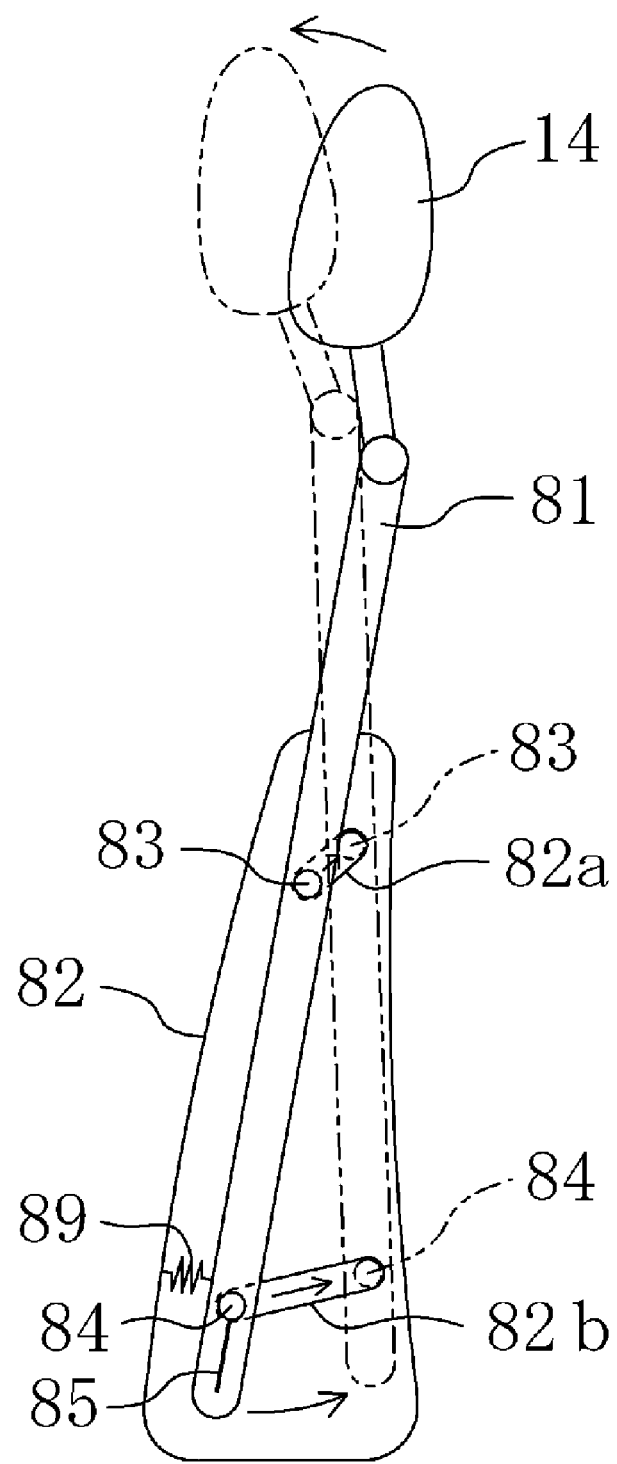
FIG. 15 is a sectional view taken along line XIV-XIV of FIG. 14.

A seat system 1 according to a fourth embodiment of the present invention further comprises a second drive mechanism 80 as an additional drive mechanism, in addition to the derive mechanism (first drive mechanism) 50, as shown in FIGS. 13-15.

A seat cushion frame 93 is disposed inside the seat cushion 12. A seat back frame 81 and a pair of side frames 82, 82 are provided inside the seat back 13. The pair of side frames 82, 82, which extends substantially vertically at both-side ends of the seat back 13, is attached to rear end portions of the seat cushion frame so as to rotate via reclining adjusters 87, 87. The both reclining adjusters 87, 87 are interconnected by a connection shaft 94 that extends in the vehicle width direction. When an operational lever (not illustrated) that is attached to either one of the relining adjusters 87 is operated, both relining adjusters 87, 87 are operated. Thereby, an angle of rotational position of the side frames 82, 82 can be set (fixed) to a specified angle.

The second drive mechanism 80, as shown in FIGS. 13 and 14, comprises the seat back frame 81 and a load receiving portion 85, and is supported at the side frames 82 of the seat back 13. Herein, illustration of the cable member 54 and the like is omitted for simplicity in FIGS. 13 and 14.

The seat back frame 81 is formed in substantially reverse-U shape, when viewed from the front, and comprises an upper frame portion 81a that extends in the vehicle width direction and a pair of side frame portions 81b, 81b that extends vertically at both sides. The headrest 14 is attached to the upper frame portion 81a via the cylindrical member 13a as described above. The load receiving portion 85, which is made of resin or metal, is attached to a lower end portion of the side frame portion 81b, 81b. This load receiving portion 85 is positioned substantially at the same level as the waist of the passenger P seated in the seat. Thus, the load receiving portion 85 is configured to receive a load of the rearward movement of the passenger P at the vehicle rear crash. Further, a S-shaped spring 86 to support the back of the passenger P is provided between the side frame portions 81b, 81b.

First bolts 83, 83 that project outward are fixed to outside faces of the side frame portion 81b, 81b of the seat back frame 81 substantially at a middle position between the upper frame portion 81a and the load receiving portion 85. The both bolts 83, 83 are located coaxially. The above-described location of the blots 83, 83 in which they are substantially at the middle position is to set the ratio of a rearward-movement amount of the load receiving portion 85 to a forward-movement amount of the headrest 14 to be 1:1 when the seat back frame 81 rotates around a pivot point of the first bolts 83, 83 at the vehicle rear crash, thereby ensuring a properly great movement of the headrest 14.

Further, second bolts 84, 84 that project outward are fixed to outside faces of the lower end portions of the side frame portion 81b, 81b. The both bolts 84, 84 are located coaxially.

First slots 82a, 82a to receive the first bolts 83, 83 of the seat back frame 81 are formed at upper end portions of the side frames 82, 82. Further, second slots 82b, 82b to receive the second bolts 84, 84 of the seat back frame 81 are formed at lower end portions of the side frames 82, 82. The second slot 82b is longer than the first slot 82a. The first and second slots 82a, 82b are provided so as to extend slant in such a manner that they extend upward and rearward. A front end of the first slot 82a is located in back of a front end of the second slot 82b, and a rear end of the first slot 82a is located in front of a rear end of the second slot 82b. Nuts 88 . . . engage with the first and second bolts, respectively.

Coil springs 89, 89 are placed between a front face portion of the both-side portions of the load receiving portion 85 and a front-end face portion of the lower end portion of the side frames 82, 82. Thus, the load receiving portion 85 (seat back frame 81) is always pulled forward by the tension of the coil springs 89, 89. The magnitude of the tension of the coil springs 89 is set in such a manner that when the load receiving portion 85 receives the rearward-movement load of the passenger P at the vehicle rear crash, the seat back frame 81 could move rearward against this tension, and in a normal state other than that, the seat back frame 81 could not move even if the passenger P pushes the headrest 14 forward.

The seat back frame 81 is supported at the side frames 82, 82 in such a manner that the first bolts 83 slide in the first slots 82a and the second bolts 84 slide in the second slot 82b as shown in FIG. 15. Since the load receiving portion 85 of the seat back frame 81 is pulled forward by the coil springs 89, 89 in the normal state (other than the vehicle rear crash), the first bolts 83 are located at the front ends of the first slots 82a, and the second bolts 84 are located at the front ends of the second slots 82b (see their positions shown by slid lines in FIG. 15). Since the font ends of the first slots 82a are located in back of the front ends of the second slots 82b, the seat back frame 81 is positioned (inclined) rearward in the normal state.

Meanwhile, since the load receiving portion 85 receives the rearward-movement load of the passenger P at the vehicle rear crash, the first bolts 83 move to the rear ends of the first slots 82a, and the second bolts 84 move to the rear ends of the second slots 82b (see their positions shown by two-dotted broken lines in FIG. 15). Since the rear ends of the first slots 82a are located in front of the rear ends of the second slots 82b, the seat back frame 81 is positioned (inclined) forward in the state where the load receiving portion has moved rearward. Further, since the first and second slots 82a, 82b are provided so as to extend slant in such a manner that they extend upward and rearward, the seat back frame 81 moves upward in accordance with the rearward movement of the first and second bolts 83, 84.

Thus, since the seat back frame 81 moves forward and upward with a drive force of the rearward-movement load the load receiving portion 85 receives, the headrest 14 moves forward and upward by a specified amount as well. This amount may be 5 cm, for example. Herein, FIG. 15 illustrates the frame structure schematically and sizes and slant angles of the side frame 82 and the slots 82a, 82b are illustrated exaggeratedly to show movements of the seat back frame 81 and the others recognizably.

Figure 19:
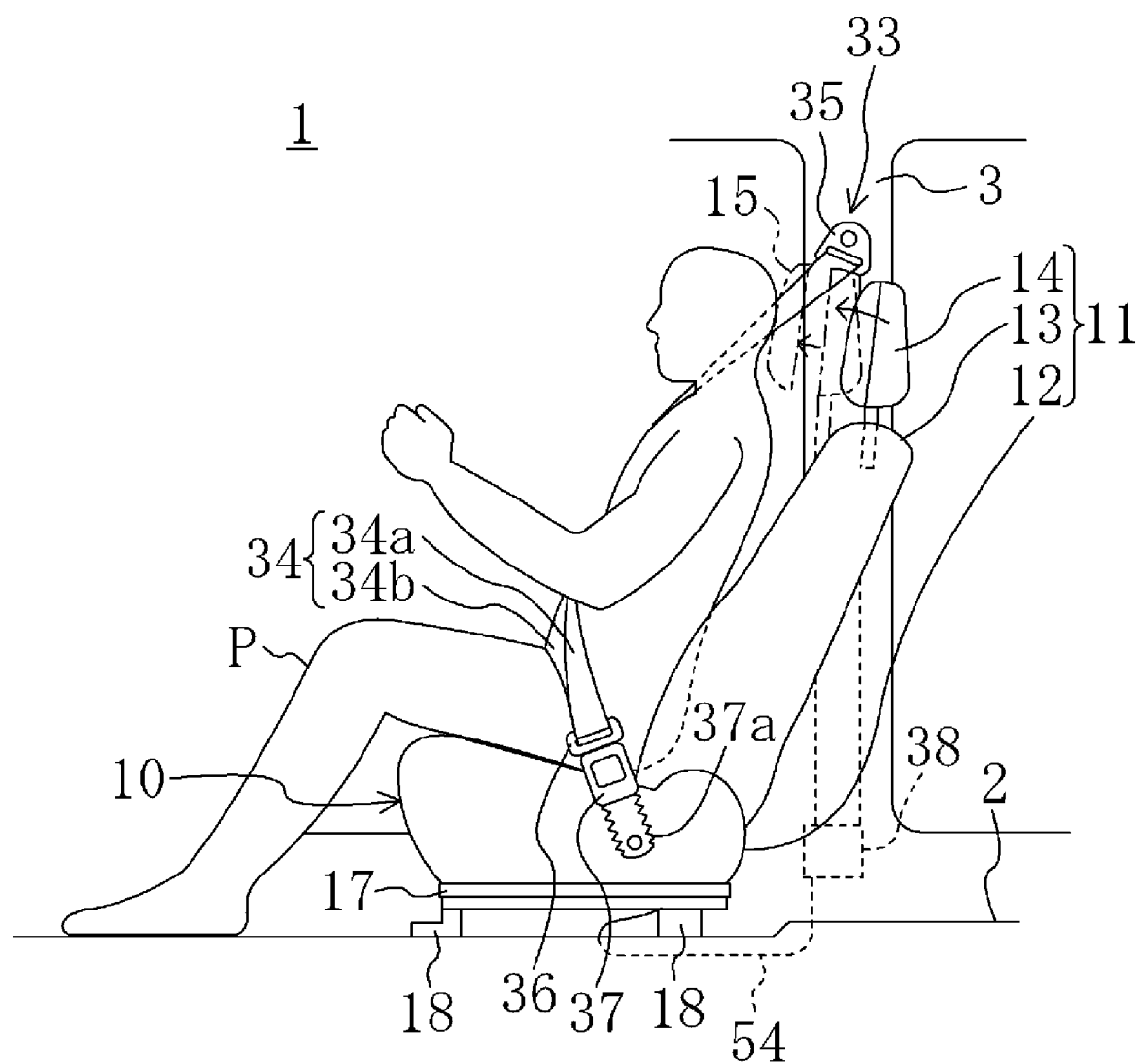
FIG. 19 is a side view of a driver's seat at a vehicle rear crash.

Hereinafter, the operation of the second drive mechanism 80 of the seat system 1 of the present embodiment will be described referring to FIGS. 15 and 19.

When the load of the rearward movement of the passenger P that is greater than the specified load is applied to the load receiving portion 85 at the vehicle rear crash, the load receiving portion 85 moves rearward against the tension of the coil springs 89. Thereby, the seat back frame 81 moves rearward as well, and the first bolts 83 move to the rear end of the first slots 82a and the second blots 84 move to the rear end of the second slots 82b. Since the rear ends of the first slots 82a are located in front of the rear ends of the second slots 82b, the seat back frame 81 rotates (leans) forward in accordance with the movements of the first an second bolts 83, 84. Further, since the first and second slots 82*a*, 82*b* are formed so as to extend upward and rearward obliquely, the seat back frame 81 moves upward. In accordance with the forward-and-rearward movement of the seat back frame 81, the headrest 14 moves forward and upward as well. As a result, as shown in FIG. 19, the movement amount of the headrest 14 by the second drive mechanism 80 is added to the movement amount of the headrest body 15 by the first drive mechanism 50. Accordingly, the gap between the headrest 14 and the passenger's head can be surely diminished.

According to the present embodiment, since the second drive mechanism 80 moves the headrest (including the headrest body 15) 14 in addition to the first drive mechanism 50 moving the headrest body 15, the movement of the headrest body 15 can be made greater. Further, since the first drive mechanism 50 is configured to drive in accordance with the winding operation of the webbing 34 of the tensioner mechanism 38 via the connection member 54, the headrest body 15 can be moved promptly at the vehicle rear crash. Accordingly, the passenger's head can be supported stably with the headrest 14 by quickly and surely diminishing the gap between the headrest 14 and the passenger's head at the detection of the vehicle rear crash. Thus, the protection of the passenger P can be improved.

Further, since the second drive mechanism 80 is configured to drive so as to move the headrest 14 forward and upward with the drive force of the load of the rearward movement of the passenger P that is received at the load receiving portion 85, there is no need of providing any additional source of drive force. Accordingly, the amount of movement of the headrest body 15 can be made greater with the simple seat stricture.

Embodiment 5

A seat system 1 according to a fifth embodiment of the present invention comprises a modified second drive mechanism 80'.

Figure 16:
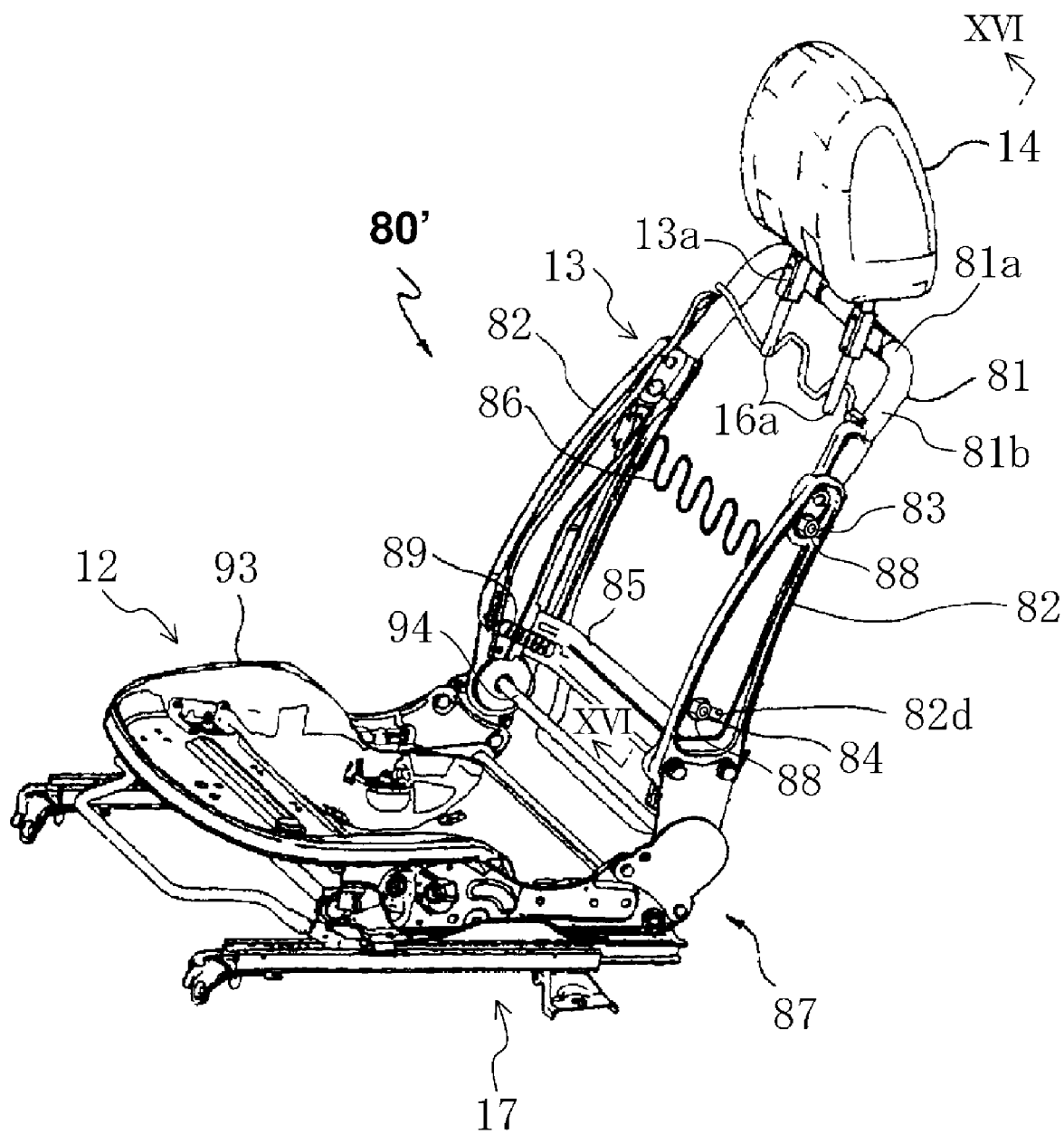
FIG. 16 is an exploded perspective view showing a frame structure of a seat according to a fifth embodiment of the present invention.
Figure 17:
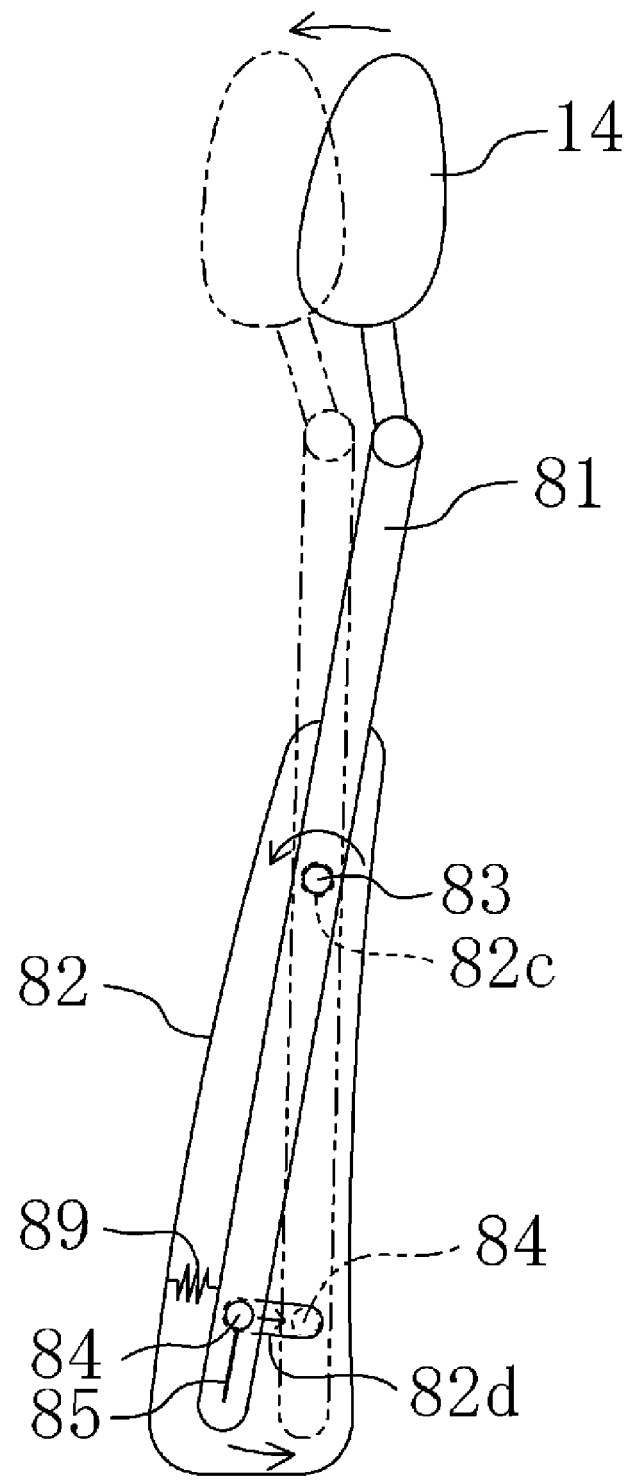
FIG. 17 is a sectional view taken along line XVI-XVI of FIG. 16.

As shown in FIG. 16, through holes 82*c*, 82*c* into which the first bolts 83, 83 of the seat back frame 81 are inserted respectively are formed at the upper end portions of the side frames 82, 82 (see FIG. 17). Further, slots 82*d*, 82*d* into which the second bolts 84, 84 of the seat back frame 81 are inserted respectively are formed at the lower end portions of the side frames 82, 82. Each slot 82*d* is formed in an arc shape so that a center line thereof that extends substantially longitudinally constitutes part of a periphery of a circle having its center at location of the through hole 82*c*. Forming the slots 82*d*, 82*d* at the side frames 82, 82 is to restrict the movement amount of the second bolts 84, 84 with the slots 82*d*, 82*d* when the lower end portion of the seat back frame 81 moves rearward receiving the load by the load receiving portion 85 at the vehicle rear crash, so that the seat back frame 81 can be prevented from rotating too much.

The seat back frame 81 is supported at the side frames 82, 82 in such a manner that the first bolts 83 rotate in the through holes 82*c* and the second bolts 84 slide in the second slot 82*d* as shown in FIG. 17. Since the load receiving portion 85 of the seat back frame 81 is pulled forward by the coil springs 89, 89 in the normal state, the second bolts 84 are located at front ends of the slots 82*d* (see their positions shown by the slid lines in FIG. 15). Meanwhile, since the load receiving portion 85 receives the rearward-movement load of the passenger P at the vehicle rear crash, the second bolts 84 move to the rear ends of the slots 82*d* (see their positions shown by two-dotted broken lines in FIG. 15). As a result, the seat back frame 81 rotates around the center of the first bolts 83, 83 in a direction shown by an arrow. Thus, the headrest 14 can move forward by a specified amount with the drive force that the load receiving portion 85 receives. Herein, FIG. 17 illustrates the frame structure schematically and sizes and slant angles of the side frame 82 and the slots 82*d*, 82*d* are illustrated exaggeratedly to show movements of the seat back frame 81 and the others recognizably.

Meanwhile, when the load of the rearward movement of the passenger P that is greater than the specified load is applied to the load receiving portion 85 at the vehicle rear crash, the load receiving portion 85 moves rearward against the tension of the coil springs 89. Thereby, the seat back frame 81 rotates counterclockwise around the first bolts 83 as shown in FIG. 17, and the headrest 14 moves forward as well. As a result, the movement amount of the headrest 14 by the second drive mechanism 80' is added to the movement amount of the headrest body 15 by the first drive mechanism 50. Accordingly, the gap between the headrest 14 and the passenger's head can be surely diminished (see FIG. 19).

According to the present embodiment, like the above-described fourth embodiment, the movement of the headrest body 15 can be made greater and the headrest 14 can be moved promptly. Accordingly, the passenger's head can be supported stably with the headrest 14 by quickly and surely diminishing the gap between the headrest 14 and the passenger's head at the detection of the vehicle rear crash. Thus, the protection of the passenger P can be improved.

Embodiment 6

A seat system 1 according to a sixth embodiment of the present invention comprises another modified second drive mechanism 80" that moves the headrest 14 forward with another drive source, which is different from the above-described embodiments 4 and 5.

Figure 18:
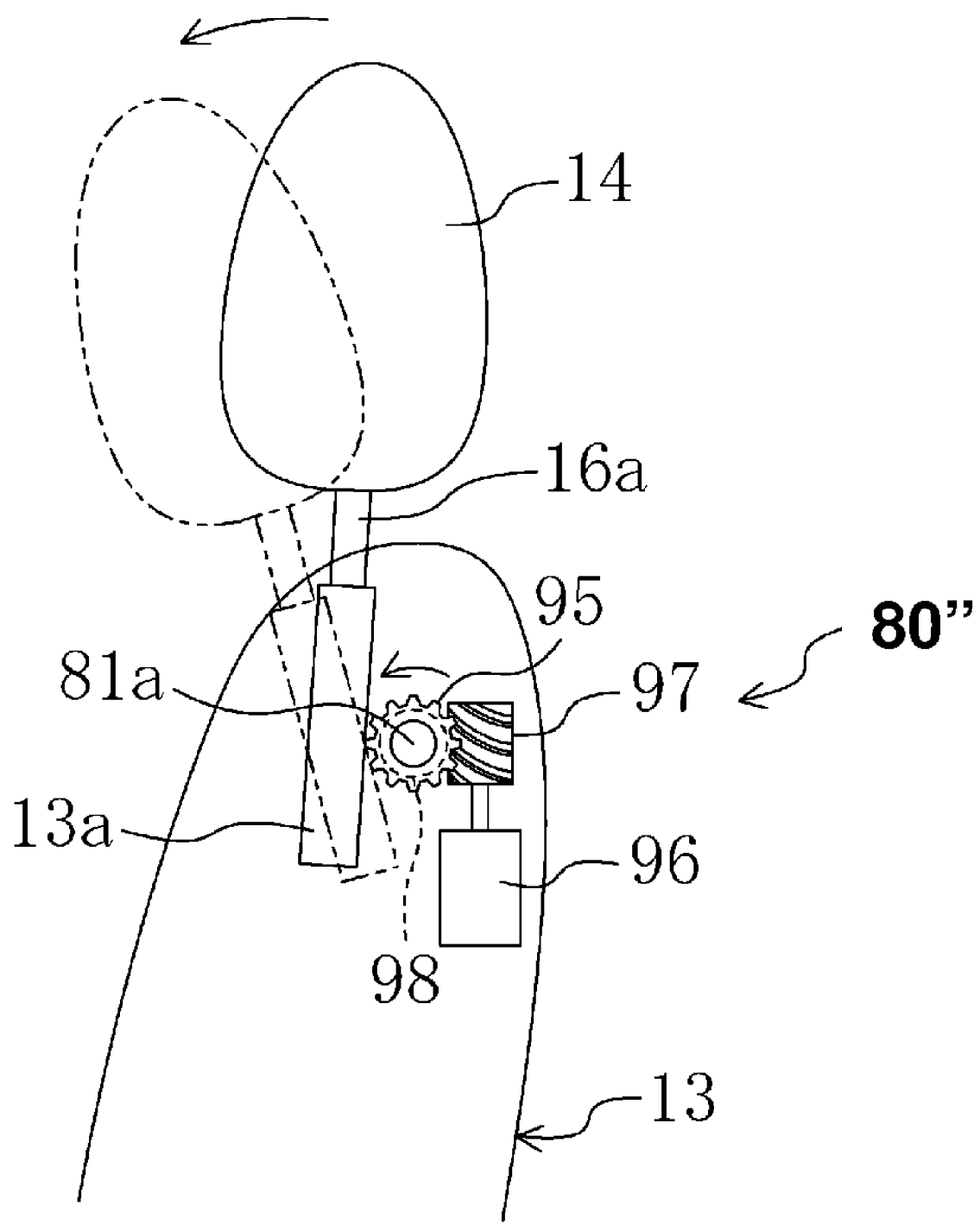
FIG. 18 is a sectional view of an upper portion of a seat according to a sixth embodiment of the present invention.

As shown in FIG. 18, the pipe frames 16*a*, 16*a* of the headrest 14 are movably inserted into the cylindrical members 13*a*, 13*a*. The cylindrical members 13*a*, 13*a* are attached to a pipe member 98 that is provided so as to extend in the vehicle width direction with a space therebetween. The pipe member 98 has an inner diameter that is almost the same as the diameter of the upper frame portion 81*a*, and is configured to rotate the upper frame portion 81*a*. The pipe members 13*a*, 13*a* are configured to lean forward and rearward in accordance with the rotation of the pipe member 98. Thereby, the headrest 14 can move longitudinally.

A pinion portion 95 is provided at about the center of the pipe member 98 in the vehicle width direction, i.e., between the two cylindrical members 13*a*, 13*a*. Thus, the pipe member 98 rotates around the upper frame portion 81*a* according to the rotation of the pinion portion 95.

An electric motor (drive resource) 96 is disposed in the seat back 13, and a worm gear engages with the pinion portion 95. An operation (rotation in a normal direction and in a reverse direction) of the electric motor 96 at the time the vehicle rear crash is detected or predicted or at the time an avoidance of the vehicle rear crash is detected is controlled by the control device 32. Herein, the prediction of the vehicle rear crash is conducted by calculating the distance to or the position of an obstacle with sensors, such as a radar or a camera (not illustrated), and the control device 32. Further, when the rear-crash detection sensor 31 provided at the rear end portion of the vehicle detects no actual crash in a specified period of time after the prediction of rear crash, it outputs a rear-crash avoidance detection signal to the control device 32 when it is detected that the vehicle rear crash that has been predicted is avoided.

When the vehicle rear crash is predicted, the control device 32 drives the electric motor 96 to rotate the pinion portion 95 counterclockwise shown in FIG. 18 for moving the headrest 14 forward. Meanwhile, the avoidance of the vehicle rear crash is detected after the rear-crash prediction, the control device 32 drives the electric motor 96 to rotate the pinion portion 95 clockwise shown in FIG. 18 for moving the headrest 14 rearward.

Thus, when the control device 32 predicts the vehicle rear crash, the electric motor 96 of the second drive mechanism 80" rotates in the normal direction and the pinion portion 95 rotates counterclockwise shown in FIG. 18. Thereby, the pipe member 98 rotates around the upper frame portion 81a counterclockwise, so the cylindrical members 13a, 13a lean forward. As a result, the headrest 14 moves forward (see a position shown with a two-dotted broken line in FIG. 18).

Then, in the present state, when the control device 32 receives the rear-crash avoidance detection signal from the rear-crash detection sensor 31, the electric motor 96 of the second drive mechanism 80" rotates in the reverse direction and the pinion portion 95 rotates clockwise shown in FIG. 18. Thereby, the pipe member 98 rotates around the upper frame portion 81a clockwise, so the cylindrical members 13a, 13a return to its upright position. As a result, the headrest 14 moves rearward to its normal position (see a position shown with a solid line in FIG. 18).

Meanwhile, when the control device 32 receives the rear-crash detection signal from the rear-crash detection sensor 31, the second drive mechanism 80" drives the headrest 14 to move forward and the first drive mechanism 50 drives the headrest body 15 to move forward. As a result, the movement amount of the headrest 14 by the second drive mechanism 80" is added to the movement amount of the headrest body 15 by the first drive mechanism 50. Accordingly, the gap between the headrest 14 and the passenger's head can be surely diminished (see FIG. 19).

According to the present embodiment, since the second drive mechanism 80" moves the headrest 14 so as to quickly diminish the gap between the headrest 14 and the passenger's head at the prediction of the vehicle rear crash as well, the protection of the passenger P can be further improved. Further, the second drive mechanism 80" moves the headrest 14 rearward when it is detected that the vehicle rear crash that has been predicted is avoided. Accordingly, the passenger P needs not to operate the headrest 14, which has moved forward at the prediction of the vehicle rear crash, to return to the rearward position. Accordingly, any troublesome operation may be avoided.

Further, the second drive mechanism 80" is configured to drive the electric motor 96 so as to move the headrest 14 when receiving the rear-crash detection signal from the rear-crash detection sensor 31, instead of utilizing the rearward movement of the passenger P at the vehicle rear crash for moving the headrest 14. That is, the second drive mechanism 80" moves the headrest 14 quickly at the vehicle rear crash. In addition, the first drive mechanism 50 moves the headrest body 15 quickly. Accordingly, the passenger's head can be supported stably with the headrest 14 by quickly and surely diminishing the gap between the headrest 14 and the passenger's head. Thus, the protection of the passenger P can be further improved.

Since the tensioner mechanism 38 is configured to operate when the vehicle frontal crash is detected or predicted, the passenger's restraint with the webbing 34 can be ensured when the vehicle frontal crash is detected or predicted. Further, since the second drive mechanism 80" does not operate when the vehicle frontal crash is detected or predicted, the amount of movement of the headrest body 15 becomes smaller compared to when both the first and second drive mechanisms 50, 80" operate. Accordingly, it can be prevented for the neck of the passenger P to bend downward improperly greatly when the passenger P is restrained at the seat 11 at the vehicle frontal crash. Thus, the passenger's protection at the detection or prediction of the vehicle frontal crash can be improved without the passenger P feeling improperly.

Herein, although the second drive mechanisms 80, 80' are configured to move the headrest 14 with the drive force of the load received by the load receiving portion 85, the headrest 14 may be moved according to a load in putted to a load sensor that is disposed at the seat back 13 or the seat cushion 12. By disposing the load sensor like this, the second drive mechanism may move the headrest 14 by utilizing the rearward movement of the passenger P at the detection of the vehicle rear crash.

The first drive mechanism 50 is comprised of a spring type and the second drive mechanism 80 is comprised of a slot-moving type in the fourth embodiment, and the first drive mechanism 50' is comprised of a rack-and-pinion type and the second drive mechanism 80' is comprised of a rotational type in the fourth embodiment. However, combination of the first and second drive mechanisms 50, 50', 80, 80' may not limited to the above-described one. A seat system with the combination of the spring type of first drive mechanism and the rotational type of second drive mechanism, or another seat system with the combination of the rack-and-pinion type of first drive mechanism and the slot-moving type of second drive mechanism may perform the same effects as the above-described embodiments.

Further, the second drive mechanism may not be limited to the slot-moving type or the rotational type. Although the second drive mechanism 80, 80' are supported at the side frames 82, 82 respectively in the fourth and fifth embodiments, the second drive mechanism may be supported at the seat back frame 81. Thus, any seat system 1 with any combination of any mechanism for moving the headrest body 15 and any mechanism for moving the headrest 14 should fall into the scope of the present invention.

What is claimed is:

1. A seat system, comprising:
a seat for a vehicle, the seat comprising a movable portion that is provided so as to change a position thereof relative to a body of the seat;
a tensioner mechanism operative to wind a webbing of a seatbelt to restrain a passenger seated in the seat when a vehicle crash is detected or predicted; and
a drive mechanism operative to drive the movable portion of the seat so as to change the position of the movable portion to a specified position for protection of the passenger seated in the seat,
wherein the tensioner mechanism is coupled to the drive mechanism via a connection member so that a winding movement of the webbing of the seatbelt by the tensioner mechanism can be transmitted to the drive mechanism via the connection member, whereby the movable portion of the seat can be driven by the drive mechanism in accordance with operation of the tensioner mechanism, and
the tensioner mechanism is disposed near the seat, there is provided a seat slide mechanism operative to move the seat in a vehicle longitudinal direction relative to a vehicle floor panel, and the connection member is comprised of a flexible member.

2. The seat system of claim 1, wherein the connection member is coupled to the tensioner mechanism via the webbing of the seatbelt.

3. A seat system, comprising:
- a seat for a vehicle, the seat comprising a movable portion that is provided so as to change a position thereof relative to a body of the seat;
- a tensioner mechanism operative to wind a webbing of a seatbelt to restrain a passenger seated in the seat when a vehicle crash is detected or predicted; and
- a drive mechanism operative to drive the movable portion of the seat so as to change the position of the movable portion to a specified position for protection of the passenger seated in the seat,
- wherein the tensioner mechanism is coupled to the drive mechanism via a connection member so that a winding movement of the webbing of the seatbelt by the tensioner mechanism can be transmitted to the drive mechanism via the connection member, whereby the movable portion of the seat can be driven by the drive mechanism in accordance with operation of the tensioner mechanism, and
- the movable portion of the seat is driven so as to change to the specified position when the vehicle crash is detected or predicted, and the drive mechanism comprises a biasing member that is provided between the movable portion and the seat body so as to bias the movable portion in a direction of movement of the movable portion, an engaged member that is provided at the movable portion, and an engaging member that is provided at the seat body so as to be coupled to the tensioner mechanism via the connection member and to usually engage with the engaged member against biasing of the biasing member, and the drive mechanism is configured such that the engaging member is moved via the connection member in accordance with the webbing-winding operation of the tensioner mechanism so as to release an engagement with the engaged member, thereby the movable portion is moved in the direction of movement of the movable portion by the biasing of the biasing member.

4. The seat system of claim 3, wherein an amount of winding of the webbing of the tensioner mechanism that is necessary for releasing engagement between the engaged member and the engaging member is configured to be smaller than a whole amount of winding of the webbing of the tensioner mechanism.

5. A seat system, comprising:
- a seat for a vehicle, the seat comprising a movable portion that is provided so as to change a position thereof relative to a body of the seat;
- a tensioner mechanism operative to wind a webbing of a seatbelt to restrain a passenger seated in the seat when a vehicle crash is detected or predicted; and
- a drive mechanism operative to drive the movable portion of the seat so as to change the position of the movable portion to a specified position for protection of the passenger seated in the seat,
- wherein the tensioner mechanism is coupled to the drive mechanism via a connection member so that a winding movement of the webbing of the seatbelt by the tensioner mechanism can be transmitted to the drive mechanism via the connection member, whereby the movable portion of the seat can be driven by the drive mechanism in accordance with operation of the tensioner mechanism, and
- the movable portion of the seat is driven so as to change to the specified position when the vehicle crash is detected or predicted, and the drive mechanism comprises a rack that is provided at the movable portion and a pinion that is provided at the seat body so as to be coupled to the tensioner mechanism via the connection member and to engage with the rack, and the drive mechanism is configured such that the pinion is rotated via the connection member in accordance with the webbing-winding operation of the tensioner mechanism so as to move the rack relative to the pinion, thereby the movable portion is moved in the direction of movement of the movable portion by the rack moving.

6. The seat system of claim 5, wherein an amount of winding of the webbing of the tensioner mechanism that is necessary for the rack to complete moving is configured to be smaller than a whole amount of winding of the webbing of the tensioner mechanism.

7. A seat system, comprising:
- a seat for a vehicle, the seat comprising a movable portion that is provided so as to change a position thereof relative to a body of the seat;
- a tensioner mechanism operative to wind a webbing of a seatbelt to restrain a passenger seated in the seat when a vehicle crash is detected or predicted; and
- a drive mechanism operative to drive the movable portion of the seat so as to change the position of the movable portion to a specified position for protection of the passenger seated in the seat,
- wherein the tensioner mechanism is coupled to the drive mechanism via a connection member so that a winding movement of the webbing of the seatbelt by the tensioner mechanism can be transmitted to the drive mechanism via the connection member, whereby the movable portion of the seat can be driven by the drive mechanism in accordance with operation of the tensioner mechanism, and
- the drive mechanism comprises a holding mechanism operative to hold the position of the movable portion of the seat at the specified position even after the position of the movable portion of the seat has been changed to the specified position.

8. The A seat system, comprising:
- a seat for a vehicle, the seat comprising a movable portion that is provided so as to change a position thereof relative to a body of the seat;
- a tensioner mechanism operative to wind a webbing of a seatbelt to restrain a passenger seated in the seat when a vehicle crash is detected or predicted; and
- a drive mechanism operative to drive the movable portion of the seat so as to change the position of the movable portion to a specified position for protection of the passenger seated in the seat,
- wherein the tensioner mechanism is coupled to the drive mechanism via a connection member so that a winding movement of the webbing of the seatbelt by the tensioner mechanism can be transmitted to the drive mechanism via the connection member, whereby the movable portion of the seat can be driven by the drive mechanism in accordance with operation of the tensioner mechanism, and
- the tensioner mechanism is configured to operate to wind the webbing of the seatbelt at least when a vehicle frontal crash is detected or predicted, and the movable portion of the seat that is driven by the drive mechanism comprises a front portion of a seat cushion that is configured to move upward at least when the vehicle frontal crash is detected or predicated.

9. A seat system, comprising:

a seat for a vehicle, the seat comprising a movable portion that is provided so as to change a position thereof relative to a body of the seat;

a tensioner mechanism operative to wind a webbing of a seatbelt to restrain a passenger seated in the seat when a vehicle crash is detected or predicted; and a drive mechanism operative to drive the movable portion of the seat so as to change the position of the movable portion to a specified position for protection of the passenger seated in the seat, wherein the tensioner mechanism is coupled to the drive mechanism via a connection member so that a winding movement of the webbing of the seatbelt by the tensioner mechanism can be transmitted to the drive mechanism via the connection member, whereby the movable portion of the seat can be driven by the drive mechanism in accordance with operation of the tensioner mechanism, and the tensioner mechanism is configured to operate to wind the webbing of the seatbelt at least when a vehicle rear crash is detected or predicted, and the movable portion of the seat that is driven by the drive mechanism comprises a headrest body of the seat that is configured to move forward and/or upward at least when the vehicle rear crash is detected or predicated.

10. The seat system of claim 9, wherein the drive mechanism is configured so that said movement of the headrest body can be complete before or at the time of completion of winding the webbing of the tensioner mechanism.

11. The seat system of claim 9, wherein an expansion ratio of the connection member is configured to be smaller than that of the webbing.

12. The seat system of claim 9, comprising further an additional drive mechanism operative to drive so as to move a headrest of the seat forward and/or upward when the vehicle rear crash is detected or predicated.

13. The seat system of claim 12, wherein the additional drive mechanism is provided at a seat back of the seat so as to move the headrest forward and/or upward in accordance with a rearward movement of the passenger at a vehicle rear crash.

14. The seat system of claim 13, wherein the headrest is attached to the additional drive mechanism, the additional drive mechanism is supported at a frame of the seat back and has a load receiving portion to receive a load of the rearward movement of the passenger at the vehicle rear crash, and the additional drive mechanism is configured to drive so as to move the headrest forward and/or upward with a drive force of the load of the rearward movement of the passenger that is received at the load receiving portion.

15. The seat system of claim 12, wherein the additional drive mechanism is configured to drive so as to move the headrest forward when the vehicle rear crash is detected and when the vehicle rear crash is predicted and to move the headrest rearward when it is detected that the vehicle rear crash that has been predicted is avoided, and the tensioner mechanism is configured to wind the webbing when the vehicle rear crash is detected and not to wind the webbing when the vehicle rear crash is predicted.

16. The seat system of claim 12, wherein the tensioner mechanism is configured to wind the webbing when a vehicle frontal crash is detected or predicted.

\* \* \* \* \*